(12) United States Patent
Uchiyama

(10) Patent No.: US 9,315,969 B2
(45) Date of Patent: Apr. 19, 2016

(54) WORK VEHICLE

(71) Applicant: KOMATSU LTD., Tokyo (JP)

(72) Inventor: Kou Uchiyama, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/354,703

(22) PCT Filed: Nov. 26, 2013

(86) PCT No.: PCT/JP2013/081757
§ 371 (c)(1),
(2) Date: Apr. 28, 2014

(87) PCT Pub. No.: WO2014/184978
PCT Pub. Date: Nov. 20, 2014

(65) Prior Publication Data
US 2015/0147147 A1  May 28, 2015

(51) Int. Cl.
*E02F 9/20* (2006.01)
*E02F 9/22* (2006.01)
(Continued)

(52) U.S. Cl.
CPC .............. *E02F 9/2246* (2013.01); *E02F 3/307* (2013.01); *E02F 3/32* (2013.01); *E02F 3/435* (2013.01);
(Continued)

(58) Field of Classification Search
CPC ...... B25J 19/0004; B66C 13/46; B66C 23/40; E02F 3/43; E02F 3/431; E02F 3/435; E02F 9/2033; E02F 9/2062; E02F 9/2066; E02F 9/24; E02F 9/26; E02F 9/264; E02F 9/265; E02F 9/267; F02D 17/00; F02D 17/02; F02D 29/00; F02D 29/04; F02N 11/0803; F02N 11/0814; F02N 11/0829; F02N 11/084; F15B 11/02

USPC .............. 37/245, 414; 60/327, 431, 432; 116/230; 123/179.4, 339.1, 339.14; 414/680, 685, 687; 701/36, 50, 112
See application file for complete search history.

(56) References Cited

U.S. PATENT DOCUMENTS

| | | | | | |
|---|---|---|---|---|---|
| 2,233,237 A | * | 2/1941 | Andersen | ................. | E02F 3/42 172/136 |
| 2,488,699 A | * | 11/1949 | Anthony | ............... | E02F 3/3417 414/717 |
| 3,231,044 A | * | 1/1966 | Myers | .................... | A01D 46/20 182/141 |
| 5,704,141 A | * | 1/1998 | Miura | ................... | E02F 9/2033 37/348 |
| 5,896,930 A | * | 4/1999 | Arai | ..................... | E02F 9/2232 172/2 |
| 7,617,762 B1 | * | 11/2009 | Ragner | ...................... | F16J 3/06 92/37 |
| 2003/0141132 A1 | * | 7/2003 | Kowalyk | ........... | A01B 63/1013 180/306 |

FOREIGN PATENT DOCUMENTS

GB 2425368 A 10/2006
GB 2425368 B 6/2008
(Continued)

*Primary Examiner* — Ernesto Suarez
*Assistant Examiner* — Brendan Tighe
(74) *Attorney, Agent, or Firm* — Drinker Biddle & Reath LLP

(57) ABSTRACT

A work vehicle includes a vehicle main body, a work implement, an engine, an idle reduction execution portion, and a position determination portion. The work implement is provided in the vehicle main body and includes a boom provided to be drivable in a vertical direction, an arm provided to be drivable with respect to the boom, and a bucket attached to a tip end of the arm. The idle reduction execution portion can stop the engine in an idling state. The position determination portion determines whether or not the bucket may interfere with the vehicle main body, based on a position state of rest of the work implement. When the position determination portion determines that the bucket may interfere with the vehicle main body, the idle reduction execution portion does not stop the engine, and when it is determined otherwise, the idle reduction execution portion stops the engine.

4 Claims, 28 Drawing Sheets

(51) Int. Cl.
*F02D 17/00* (2006.01)
*F02D 29/02* (2006.01)
*E02F 3/30* (2006.01)
*E02F 3/43* (2006.01)
*E02F 9/26* (2006.01)
*F02N 11/08* (2006.01)
*E02F 3/32* (2006.01)
*E02F 9/24* (2006.01)

(52) U.S. Cl.
CPC ............ *E02F 9/2033* (2013.01); *E02F 9/2285* (2013.01); *E02F 9/2296* (2013.01); *E02F 9/24* (2013.01); *E02F 9/265* (2013.01); *E02F 9/267* (2013.01); *F02D 17/00* (2013.01); *F02D 29/02* (2013.01); *F02N 11/084* (2013.01); *F02N 11/0818* (2013.01)

(56) References Cited

FOREIGN PATENT DOCUMENTS

| | | |
|---|---|---|
| JP | H02-285113 A | 11/1990 |
| JP | H06-71551 U | 10/1994 |
| JP | H07-8452 U | 2/1995 |
| JP | H08-311917 A | 11/1996 |
| JP | 2004027835 A | 1/2004 |
| JP | 2005-171905 A | 6/2005 |
| JP | 2007-100397 A | 4/2007 |
| JP | 2007-332678 A | 12/2007 |
| JP | 2012-067629 A | 4/2012 |
| JP | 2013-044292 A | 3/2013 |
| SU | 1416625 * 8/1988 | ................ E02F 9/20 |
| WO | WO-2005/064170 A1 | 7/2005 |

\* cited by examiner

FIG.10

| ARM TYPE | ARM P | ARM Q |
|---|---|---|
| THRESHOLD VALUE | $\alpha 0$ | $\alpha 1$ |

(A)

(B)

(A)

(B)

WORK VEHICLE

TECHNICAL FIELD

The present invention relates to a work vehicle and particularly to an idle reduction function.

BACKGROUND ART

Recently, for energy saving and environmental conservation, incorporation of an idle reduction function in such a work vehicle as a hydraulic excavator has been demanded. The idle reduction function refers to a function to automatically stop an engine when an idling state of a work vehicle has continued for a prescribed time period. The idling state means a state that a work vehicle stands by while an engine remains operating.

In this regard, depending on working by the work vehicle, activation of the idle reduction function may cause inconvenience. Therefore, a technique of providing a switch allowing selection as to whether or not to activate the idle reduction function has been proposed (PTD 1). With such a feature, a wide variety of matters demanded of the work vehicle can be addressed.

CITATION LIST

Patent Document

PTD 1: Japanese Patent Laying-Open No. 2005-171905

SUMMARY OF INVENTION

Technical Problem

In the above, the idle reduction function is activated/inactivated in response to on and off of the switch, and the idle reduction function may be activated regardless of a state of the work vehicle such as a rest state.

In this connection, in such a work vehicle as a hydraulic excavator, a bucket in a work implement of the work vehicle may also rest (stop) not in a state grounded to a ground surface but in a state distant from the ground surface. When an operation of the work vehicle stops in that state owing to the idle reduction function, there may also be a possibility that a bucket moves (for example, naturally lowers) from a rest state due to such an external factor as gravity and consequently it interferes with a vehicle main body of the work vehicle.

The present invention was made to solve the problems as described above, and an object thereof is to provide a work vehicle capable of suppressing interference of a bucket with a vehicle main body in a case that an operation of the work vehicle stops owing to an idle reduction function.

Other problems and novel features will become apparent from the description herein and the accompanying drawings.

Solution to Problem

A work vehicle according to one aspect of the present invention includes a vehicle main body, a work implement, an engine, an idle reduction execution portion, and a position determination portion. The work implement is provided in the vehicle main body and includes a boom provided to be drivable in a vertical direction, an arm provided to be drivable with respect to the boom, and a bucket attached to a tip end of the arm. The idle reduction execution portion can stop the engine in an idling state. The position determination portion determines whether or not the bucket may interfere with the vehicle main body based on a position state of rest of the work implement. The idle reduction execution portion does not stop the engine when the position determination portion determines that the bucket may interfere with the vehicle main body and stops the engine when the position determination portion determines that the bucket will not interfere.

According to the work vehicle in the present invention, when the position determination portion determines that the bucket may interfere with the vehicle main body due to an external factor, the engine is not stopped. Therefore, interference of the bucket with the vehicle main body when an operation of the work vehicle is stopped owing to an idle reduction function can be suppressed.

Preferably, the position determination portion determines whether or not the bucket may interfere with the vehicle main body due to an external factor based on at least any one of an angle of the arm with respect to the boom and an angle formed between the boom and the vehicle main body.

According to the above, since whether or not the bucket may interfere with the vehicle main body due to an external factor can be determined based on at least one of an angle of the arm with respect to the boom and an angle formed between the boom and the vehicle main body, determination can be made with a simple scheme.

Preferably, the position determination portion determines whether or not at least any one of the angle of the arm with respect to the boom and the angle formed between the boom and the vehicle main body satisfies a prescribed condition.

Preferably, the prescribed condition is changed in accordance with a length of the arm or the boom.

According to the above, since a prescribed condition is changed in accordance with a length of the arm or the boom, determination in correspondence with a length of the arm or the boom can be made and appropriate determination can be made.

A work vehicle according to another aspect of the present invention includes a vehicle main body, a work implement, an engine, an idle reduction execution portion, and an interference prevention control unit. The work implement is provided in the vehicle main body and includes a boom provided to be drivable in a vertical direction, an arm provided to be drivable with respect to the boom, and a bucket attached to a tip end of the arm. The idle reduction execution portion can stop the engine in an idling state. The interference prevention control unit can restrict an operation state of the work implement such that the bucket does not interfere with the vehicle main body, based on whether or not a position of the bucket is within an interference prevention region provided within a prescribed distance from an outer peripheral surface of the vehicle main body. The idle reduction execution portion does not stop the engine when the bucket is within the interference prevention region and stops the engine when the bucket is not within the interference prevention region.

According to the work vehicle in the present invention, when the bucket is within the interference prevention region, the engine is not stopped. Namely, since the engine does not stop while the bucket is at a position close to the work vehicle which is within the interference prevention region, interference of the bucket with the vehicle main body when an operation of the work vehicle is stopped owing to an idle reduction function can be suppressed.

Preferably, the boom has a first boom provided to be drivable in the vertical direction and a second boom provided to be drivable in left and right directions with the first boom being defined as a reference. The interference prevention region includes first and second interference prevention regions brought in correspondence with the left and right directions with the first boom being defined as the reference.

According to the above, in connection with what is called an offset boom type work vehicle having a first boom and a second boom, interference of the bucket with the vehicle main body when an operation of the work vehicle is stopped owing to an idle reduction function can be suppressed.

Preferably, ranges of the first and second interference prevention regions in accordance with the outer peripheral surface of the vehicle main body are the same.

According to the above, by setting the ranges of the first and second interference prevention regions to be the same, appropriate determination adapted to a form of the work vehicle can be made.

Preferably, a position determination portion and a cab are included. The position determination portion determines whether or not the bucket of the work implement may interfere with the vehicle main body due to an external factor from a rest state. The cab is provided in the vehicle main body. The arm is provided to be drivable in the left and right directions with the boom being defined as the reference. In a case that a position of the bucket is located on a side of the cab provided in one of the left and right directions with the boom being defined as the reference, the idle reduction execution portion does not stop the engine when the bucket is within the interference prevention region and stops the engine when the bucket is not within the interference prevention region, and in a case that the position of the bucket is located in the other of the left and right directions, the idle reduction execution portion does not stop the engine when the position determination portion determines that the bucket may interfere with the vehicle main body and stops the engine when the position determination portion determines that the bucket will not interfere.

According to the above, since determination is switched based on a position of the bucket, interference of the bucket with the vehicle main body when an operation of the work vehicle is stopped owing to an idle reduction function can more reliably be suppressed in conformity with to a shape of the vehicle main body.

Advantageous Effects of Invention

As described above, the work vehicle according to the present invention can suppress interference of the bucket with the vehicle main body when an operation of the work vehicle is stopped owing to an idle reduction function.

BRIEF DESCRIPTION OF DRAWINGS

FIG. 10 is a diagram illustrating a threshold value based on a first variation of the first embodiment.

DESCRIPTION OF EMBODIMENTS

An embodiment of the present invention will be described hereinafter with reference to the drawings.

First Embodiment

Overall Construction

Figure 1:
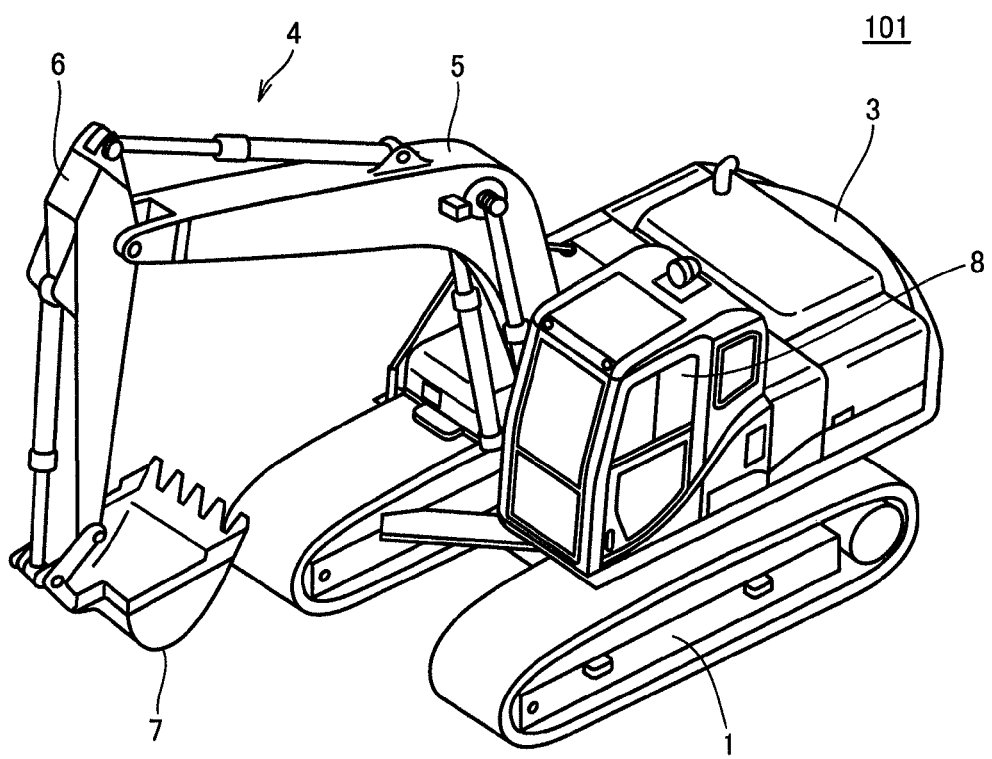
FIG. 1 is a diagram illustrating appearance of a work vehicle 101 based on a first embodiment.

FIG. 1 is a diagram illustrating appearance of a work vehicle 101 based on a first embodiment.

As shown in FIG. 1, in the present example, a hydraulic excavator will mainly be described by way of example as work vehicle 101 based on the first embodiment.

Work vehicle 101 mainly includes a lower carrier 1, an upper revolving unit 3, and a work implement 4. A work vehicle main body (also simply referred to as a vehicle main body) is constituted of lower carrier 1 and upper revolving unit 3. Lower carrier 1 has a pair of left and right crawler belts. Upper revolving unit 3 is attached revolvably to an upper portion of lower carrier 1, with a revolving mechanism being interposed.

Work implement 4 is pivotally supported by upper revolving unit 3 in a manner drivable in a vertical direction and performs such working as excavation of soil. Work implement 4 includes a boom 5, an arm 6, and a bucket 7. Boom 5 has a root portion drivably coupled to upper revolving unit 3. Arm 6 is drivably coupled to a tip end of boom 5. Bucket 7 is drivably coupled (attached) to a tip end of arm 6. In addition, upper revolving unit 3 includes a cab 8 or the like.

It is noted that work implement 4 represents one example of the "work implement" in the present invention. The vehicle main body constituted of lower carrier 1 and upper revolving unit 3 represents one example of the "vehicle main body" in the present invention, and it is not particularly limited to lower carrier 1 and upper revolving unit 3 and may include other accessory or components.

<Construction of Operator's Cab>

Figure 2:
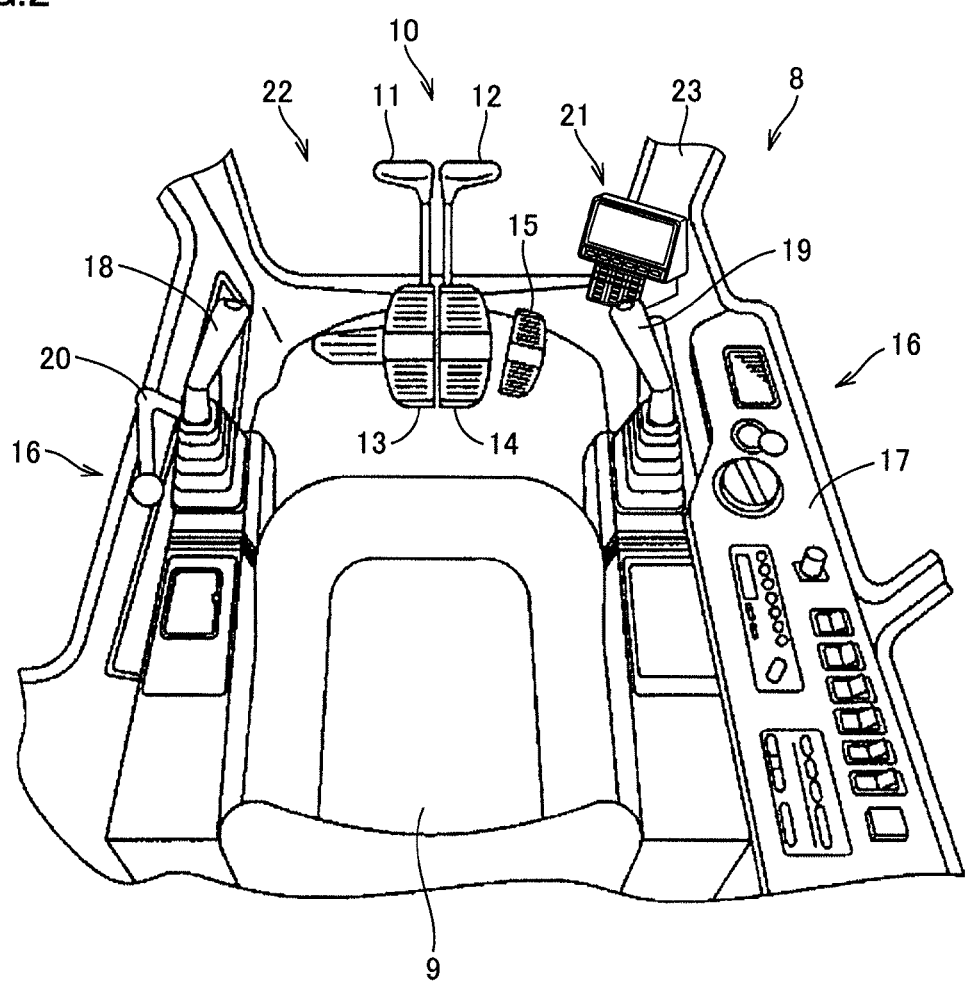
FIG. 2 is a perspective view showing an internal construction of a cab 8 based on the first embodiment.

FIG. 2 is a perspective view showing an internal construction of cab 8 based on the first embodiment.

As shown in FIG. 2, cab 8 has an operator's seat 9, a travel operation portion 10, a pedal for attachment 15, a side window 16, a dashboard 17, work implement levers 18, 19, a locking lever 20, a monitor apparatus 21, a front window 22, and a vertical frame 23.

Operator's seat 9 is provided in a central portion of cab 8. Travel operation portion 10 is provided in front of operator's seat 9.

Travel operation portion 10 includes travel levers 11, 12 and travel pedals 13, 14. Travel pedals 13, 14 can move together with respective travel levers 11, 12. Lower carrier 1 moves forward as the operator pushes forward travel lever 11, 12. Alternatively, lower carrier 1 moves backward as the operator pulls backward travel lever 11, 12.

Pedal for attachment 15 is provided in the vicinity of travel operation portion 10. In addition, dashboard 17 is provided in the vicinity of right side window 16 in FIG. 2.

Work implement levers 18, 19 are provided in left and right portions of operator's seat 9, respectively. Work implement lever 18, 19 serves to carry out vertical movement of boom 5, pivot of arm 6 and bucket 7, a revolving operation of upper revolving unit 3, and the like.

Locking lever 20 is provided in the vicinity of work implement lever 18. Here, locking lever 20 serves to stop such functions as operation of work implement 4, revolution of upper revolving unit 3, and travel of lower carrier 1. Namely, by performing an operation for positioning locking lever 20 in a horizontal state (here, an operation for pulling up the locking lever), movement of work implement 4 or the like can be locked (restricted). In a state where locking lever 20 has locked movement of work implement 4 or the like, work implement 4 or the like does not operate in spite of an operation of work implement lever 18; 19 by the operator. In addition, similarly, even though travel lever 11, 12 and travel pedal 13, 14 are operated, lower carrier 1 does not operate.

Monitor apparatus 21 is provided in a lower portion of vertical frame 23 which is a partition between front window 22 and one side window 16 of cab 8 and it displays an engine state of work vehicle 101 or the like. In addition, monitor apparatus 21 is provided to be able to accept a setting instruction as to various operations of work vehicle 101.

Here, an engine state refers, for example, to a temperature of an engine coolant, a temperature of hydraulic oil, an amount of remaining fuel, and the like. Various operations refer to setting in connection with idle reduction control and the like.

<Configuration of Control System>

Figure 3:
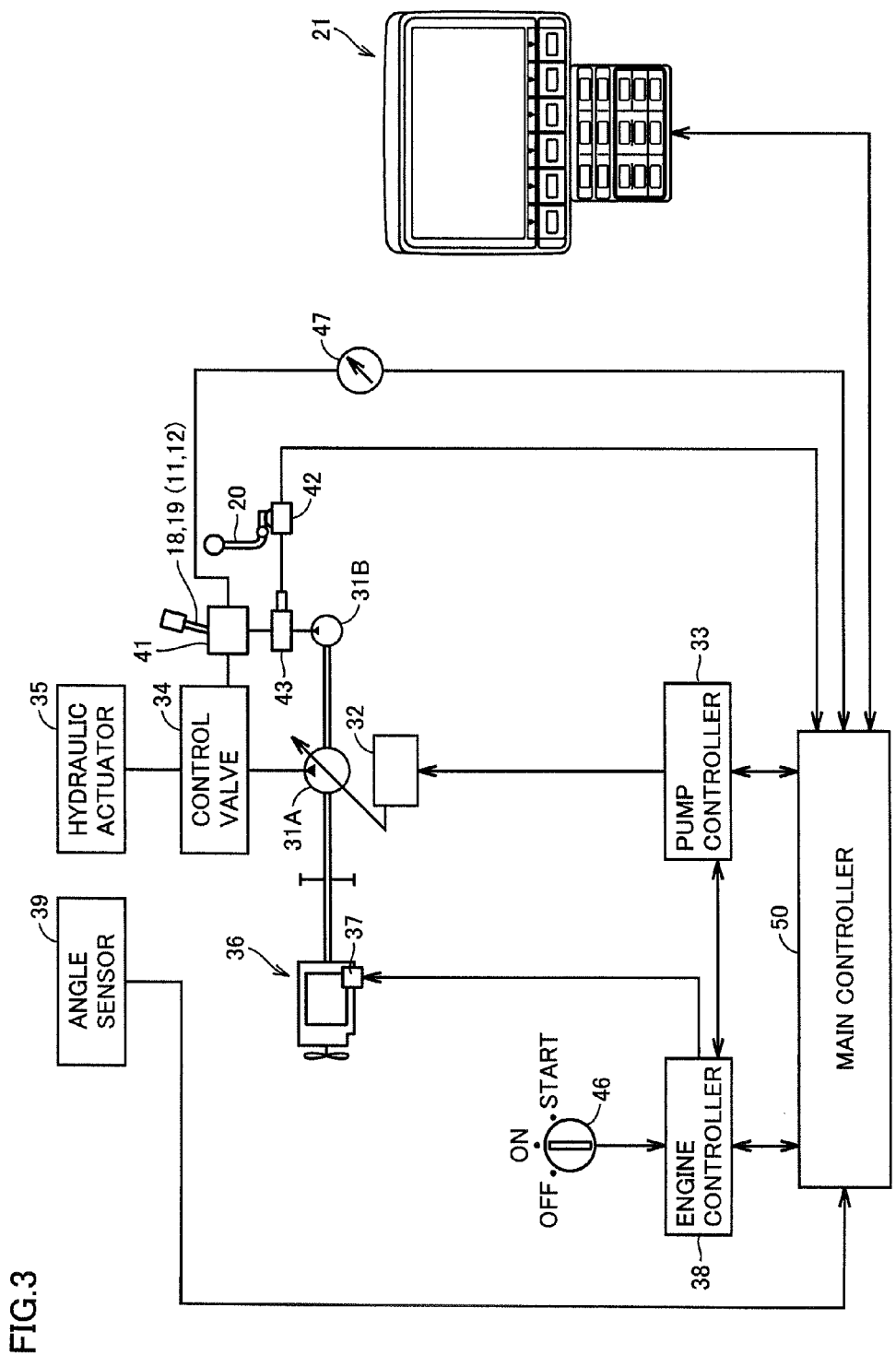
FIG. 3 is a simplified diagram showing a configuration of a control system of work vehicle 101 based on the first embodiment.

FIG. 3 is a simplified diagram showing a configuration of a control system of work vehicle 101 based on the first embodiment.

As shown in FIG. 3, the control system of work vehicle 101 includes, by way of example, work implement lever 18, 19 and travel lever 11, 12, locking lever 20, monitor apparatus 21, a first hydraulic pump 31A, a second hydraulic pump 31B, a swash plate drive apparatus 32, a pump controller 33, a control valve 34, a hydraulic actuator 35, an engine 36, a governor motor 37, an engine controller 38, an angle sensor 39, a work implement lever apparatus 41, a pressure switch 42, a valve 43, a starter switch 46, a pressure sensor 47, and a main controller 50.

First hydraulic pump 31A discharges pressure oil for generating a hydraulic pressure driving work implement 4 or the like.

Second hydraulic pump 31B discharges pressure oil for generating a hydraulic pressure in accordance with an operation of work implement lever 18, 19 and travel lever 11, 12. Swash plate drive apparatus 32 is connected to first hydraulic pump 31A.

Swash plate drive apparatus 32 drives based on an instruction from pump controller 33 and changes an angle of inclination of a swash plate of first hydraulic pump 31A. Hydraulic actuator 35 is connected to first hydraulic pump 31A with control valve 34 being interposed. Hydraulic actuator 35 is a cylinder for boom, a cylinder for arm, a cylinder for bucket, a hydraulic motor for revolution, a hydraulic motor for travel, and the like.

Control valve 34 is connected to work implement lever apparatus 41. Work implement lever apparatus 41 outputs to control valve 34, a pilot pressure in accordance with an operation direction and/or an amount of operation of work implement lever 18, 19 and travel lever 11, 12. Control valve 34 controls hydraulic actuator 35 in accordance with the pilot pressure.

Work implement lever 18, 19 and travel lever 11, 12 as well as locking lever 20 are connected to second hydraulic pump 31B.

Pressure sensor 47 is connected to work implement lever apparatus 41. Pressure sensor 47 outputs to main controller 50, a lever operation signal in accordance with a state of operation of work implement lever 18, 19 and travel lever 11, 12.

In response to an instruction from main controller 50, pump controller 33 carries out such control that first hydraulic pump 31A absorbs best matching torque at each output point of engine 36, in accordance with pump absorption torque set in accordance with an amount of working, the actual number of rotations of the engine, and the like.

Engine 36 has a drive shaft connected to first hydraulic pump 31A and second hydraulic pump 31B. Governor motor 37 adjusts an amount of fuel injection by a fuel injector within engine 36.

Engine controller 38 controls an operation of engine 36. Engine 36 is a diesel engine by way of example.

In response to an instruction from main controller 50, engine controller 38 gives an instruction to governor motor 37, controls an amount of fuel injected by the fuel injector or the like, and adjusts the number of rotations of engine 36.

Starter switch 46 is connected to engine controller 38. As the operator operates starter switch 46 (sets the starter switch to start), a start signal is output to engine controller 38 so that engine 36 starts.

Angle sensor 39 is provided in each of the cylinder for boom, the cylinder for arm, and the cylinder for bucket, and obtains information on angles of boom 5, arm 6, and bucket 7. Angle sensor 39 is connected to main controller 50 and outputs to main controller 50, information on angles of boom 5, arm 6, and bucket 7. It is noted that a single angle sensor may obtain information on each angle and output the information to main controller 50, instead of providing an angle sensor for each of them.

Main controller 50 is a controller controlling overall work vehicle 101, and it is configured with a CPU (Central Processing Unit), a non-volatile memory, a timer, and the like. Main controller 50 controls pump controller 33, engine controller 38, and monitor apparatus 21.

Pressure switch 42 is connected to locking lever 20. Pressure switch 42 senses an operation of locking lever 20 when it is operated toward a locking side, and sends a signal to valve (solenoid valve) 43. In addition, pressure switch 42 sends a similar signal also to main controller 50. Thus, such functions as operation of work implement 4, revolution of upper revolving unit 3, and travel of lower carrier 1 can be stopped. Then, in response to sensing of a signal from pressure switch 42 to main controller 50, that is, operation of locking lever 20 toward the locking side, control for an idle reduction operation is started.

<Monitor Apparatus>

A configuration of monitor apparatus 21 will now be described.

Figure 4:
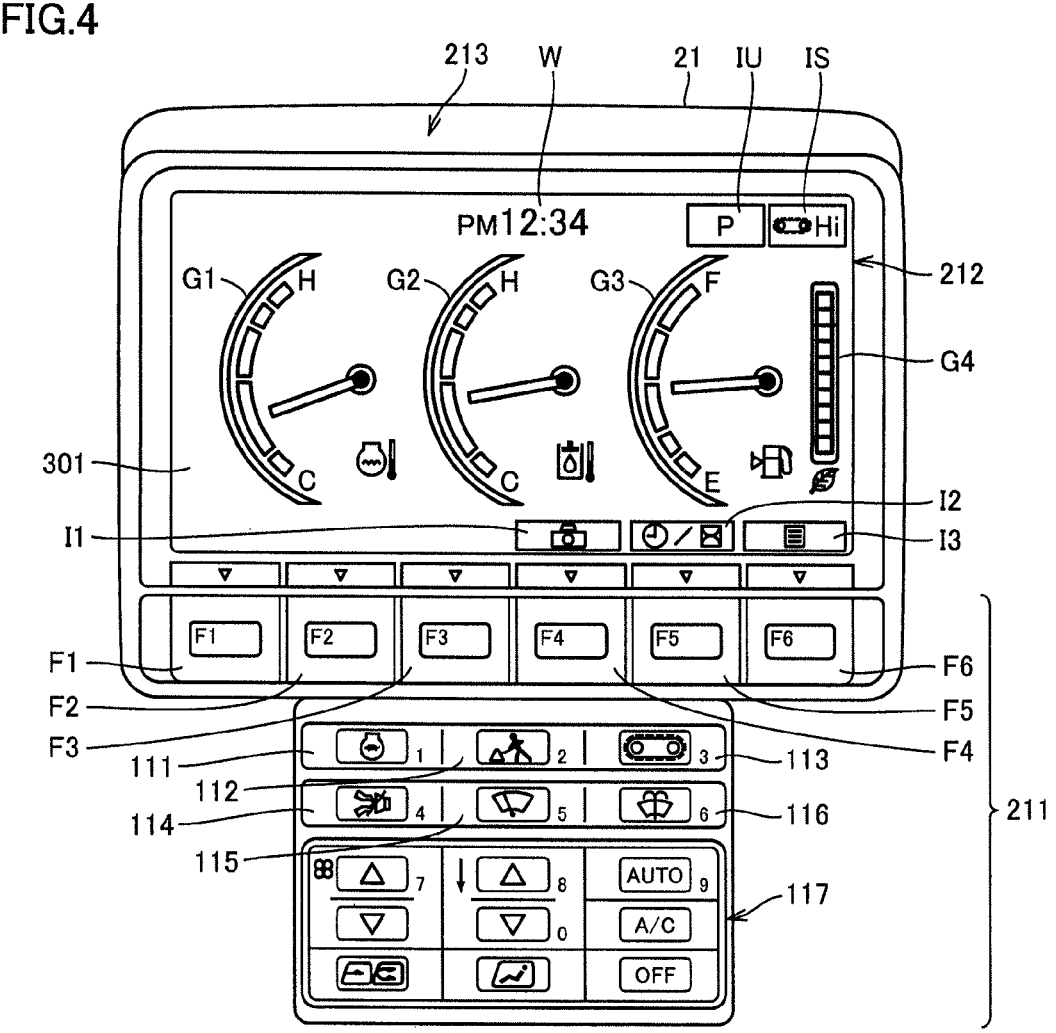
FIG. 4 is a diagram illustrating a configuration of a monitor apparatus 21 based on the first embodiment.

FIG. 4 is a diagram illustrating a configuration of monitor apparatus 21 based on the first embodiment.

As shown in FIG. 4, monitor apparatus 21 includes an input portion 211, a display portion 212, and a display control unit 213.

Input portion 211 accepts input of various types of information. Monitor apparatus 21 is connected to main controller 50, and input accepted at input portion 211 is output to main controller 50.

Display portion 212 is implemented by a liquid crystal screen or the like.

Display control unit 213 controls display contents on display portion 212. Specifically, display control unit 213 provides display of information on an operation of work vehicle 101 in response to an instruction from main controller 50. The information includes information on an engine state or guidance information.

Input portion 211 will specifically be described. Input portion 211 is constituted of a plurality of switches. Input portion 211 has function switches F1 to F6.

Function switches F1 to F6 are located in a lower portion of display portion 212 and displayed as "F1" to "F6", respectively. They are switches each for inputting a signal corresponding to an icon displayed on display portion 212 above each switch (by way of example, guidance icons I1 to I3).

In addition, input portion 211 has a deceleration switch 111, an operation mode selection switch 112, a travel speed gear selection switch 113, a buzzer cancellation switch 114, a wiper switch 115, a washer switch 116, and an air-conditioner switch 117, provided under function switches F1 to F6.

Deceleration switch 111 is a switch for carrying out deceleration control for lowering the number of engine rotations of engine 36 to a prescribed number of rotations a prescribed time period after work implement lever 18, 19 returned to a neutral position. The "neutral position" refers to a state that work implement lever 18, 19 is not operated (a non-working state) and specifically to work implement lever 18, 19 being located at an initial position.

Operation mode selection switch 112 is a switch for selecting an operation mode of work vehicle 101 from among a plurality of operation modes. Travel speed gear selection switch 113 is a switch for selecting a travel speed gear of work vehicle 101 from among a plurality of travel speed gears. Buzzer cancellation switch 114 is a switch for cancelling buzzer sound generated at the time when work vehicle 101 is in a prescribed warning condition. Wiper switch 115 is a switch for operating a wiper (not shown) provided in a windshield of cab 8 (see FIG. 2) of work vehicle 101. Washer switch 116 is a switch for actuating a washer (not shown) for injecting cleaning water toward the windshield. Air-conditioner switch 117 is a switch for operating various functions of an air-conditioner within cab 8.

It is noted that a touch panel of a resistive film type or the like is also applicable as input portion 211. In the present example, a case where work vehicle 101 displays a standard picture 301 displayed during a normal operation as a picture displayed on display portion 212 is shown.

Standard picture 301 is generated by display control unit 213 based on data for displaying a picture, which is stored in advance in a not-shown memory. This is also the case with other pictures.

In standard picture 301, an engine water temperature gauge G1, a hydraulic oil temperature gauge G2, and a fuel level gauge G3 are displayed as aligned, and a pointer of a gauge changes based on a sensor signal from each corresponding sensor. In addition, a fuel consumption gauge G4 is displayed on the right of fuel level gauge G3.

A clock W is displayed in an upper central portion of display portion 212. On the right of clock W, an operation mode icon IU indicating a set operation mode and a travel speed gear icon IS indicating a set travel speed gear are displayed.

In standard picture 301, a character "P" is displayed as operation mode icon IU. This is an indication of a case where an operation mode is set to a power mode made use of in normal excavation working or the like.

In contrast, in a case where work vehicle 101 is set to an economy mode, it is assumed that a character "E" is displayed as operation mode icon IU.

In addition, in standard picture 301, an icon including such a character string as "Hi" is displayed as travel speed gear icon IS.

This icon is an indication of a case where a travel speed gear is set to high. A travel speed gear selected and input through travel speed gear selection switch 113 includes three types of low, intermediate, and high.

Among these, when a low speed is selected, an icon including a character string "Lo" is displayed as travel speed gear icon IS. Alternatively, when an intermediate speed is selected, an icon including a character string "Mi" is displayed as travel speed gear icon IS.

At a position in a lower portion of standard picture 301 and above function switches F4 to F6, guidance icons I1 to I3 corresponding to function switches F4 to F6, respectively, are displayed.

Guidance icon I1 is an icon meaning switching of a picture displayed on display portion 212 to a camera screen. The camera screen is a screen output by means of an image signal obtained by a CCD camera or the like (not shown) installed on the exterior of work vehicle 101 and shooting an outside world of work vehicle 101. Guidance icon 12 is an icon meaning switching of display of clock W to display of a service meter. Guidance icon 13 is an icon meaning switching of a picture displayed on display portion 212 to a user mode picture. Therefore, for example, when function switch F4 corresponding to guidance icon I1 is pressed, a picture displayed on display portion 212 is switched to a camera screen.

<Functional Block Diagram>

Figure 5:
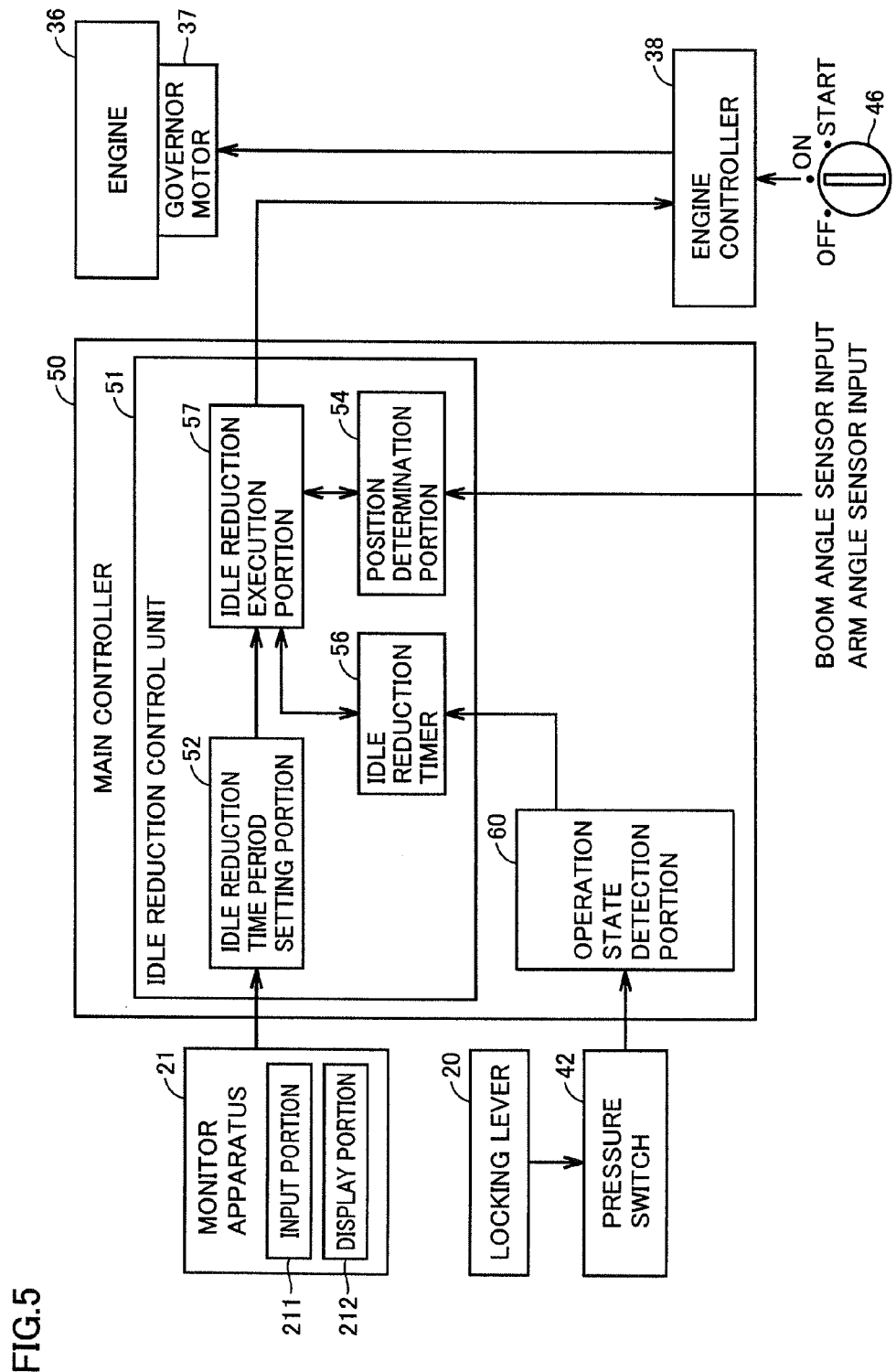
FIG. 5 is a functional block diagram illustrating an idling function of a main controller 50 in the control system of work vehicle 101 based on the first embodiment.

FIG. 5 is a functional block diagram illustrating an idling function of main controller 50 in the control system of work vehicle 101 based on the first embodiment.

As shown in FIG. 5, relation between main controller 50 and other peripheral devices is shown. Here, monitor apparatus 21, pressure switch 42, engine 36, governor motor 37, engine controller 38, and starter switch 46 are shown as the peripheral devices.

Main controller 50 includes an idle reduction control unit 51 and an operation state detection portion 60.

Idle reduction control unit 51 controls an idle reduction operation. Operation state detection portion 60 detects a state of operation of various operation levers or the like.

Idle reduction control unit 51 includes an idle reduction time period setting portion 52, a position determination portion 54, an idle reduction timer 56, and an idle reduction execution portion 57.

Idle reduction execution portion 57 outputs an engine stop signal to engine controller 38 such that an idle reduction operation for stopping engine 36 is performed when a prescribed condition is satisfied. The "idle reduction operation" refers to an operation for stopping engine 36 in an idling state of the work vehicle, that is, a state in which the work vehicle stands by while engine 36 remains operating. This prescribed condition is a performance condition for performing the "idle reduction operation," and it mainly refers to a condition relating to a prescribed time period during which the idling state of the work vehicle continues.

In the present example, the "prescribed time period" is also referred to as an idle reduction time period.

Idle reduction time period setting portion 52 sets an idle reduction time period which is an execution condition for idle reduction execution portion 57 in response to an instruction or the like from input portion 211 of monitor apparatus 21.

Idle reduction timer 56 is a timer counting time in response to an instruction from operation state detection portion 60. Then, idle reduction timer 56 outputs a result of counting to idle reduction execution portion 57. Idle reduction execution portion 57 determines whether or not an idle reduction time period has elapsed based on a result of counting (a timer value) counted by idle reduction timer 56, and when it has determined that the idle reduction time period has elapsed, it outputs an engine stop signal to engine controller 38. Engine controller 38 instructs governor motor 37 to stop engine 36, in response to the engine stop signal from idle reduction execution portion 57.

Position determination portion 54 determines whether or not bucket 7 may interfere with the vehicle main body based on a position state of rest of work implement 4 due to an external factor, and outputs a result of determination to idle reduction execution portion 57.

In the first embodiment, idle reduction execution portion 57 performs the idle reduction operation based on a result of determination from position determination portion 54. Specifically, when idle reduction execution portion 57 determines that bucket 7 may interfere with the vehicle main body based on the position state of rest of work implement 4 due to an external factor, it does not perform the idle reduction operation, and when it determines that bucket 7 will not interfere, it performs the idle reduction operation.

The "position state" of rest of work implement 4 means a state of an outer geometry of work implement 4 at the time when engine 36 has stopped. Namely, in the present example, it means such a state that boom 5, arm 6, and bucket 7 constituting work implement 4 have stopped at any angle within a drivable range.

In the present example, the "external factor" includes any external action on work implement 4 while the work vehicle is not operated, such as gravity applied to work vehicle 101, wind power, magnetic force, inclination associated with geographical features, load such as soil, or combination thereof, and for example, a case that components within work vehicle 101 fail due to an external action such as aging can also be included.

It is noted that engine 36, idle reduction execution portion 57, and position determination portion 54 represent examples of the "engine", the "idle reduction execution portion," and the "position determination portion" in the present invention, respectively.

<Setting of Idle Reduction Time Period>

Figure 6:
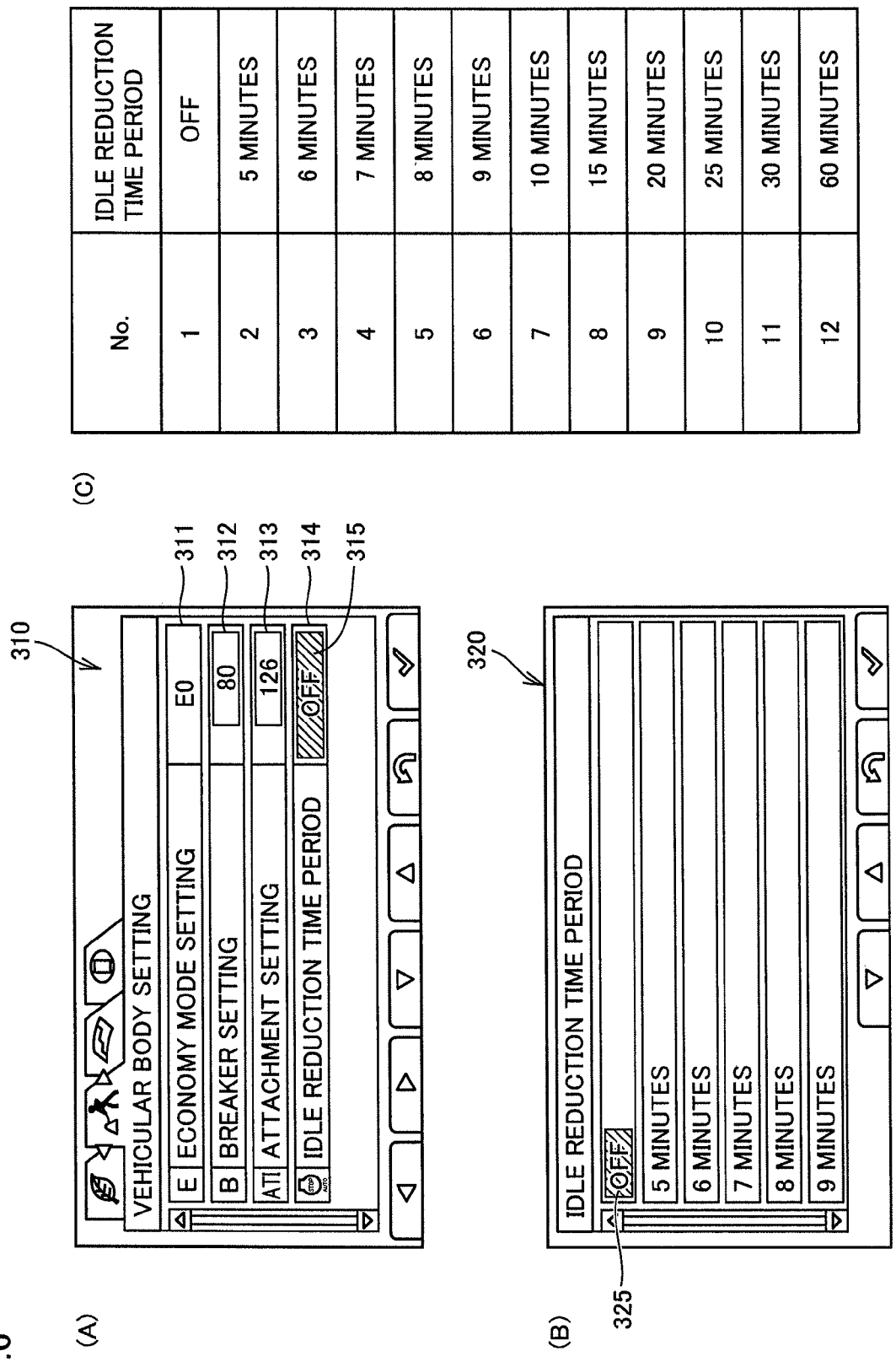
FIG. 6 is a diagram for illustrating setting of an idle reduction time period based on the first embodiment.

FIG. 6 is a diagram illustrating setting of an idle reduction time period based on the first embodiment.

FIG. 6 (A) shows one example of a user mode picture. The user mode picture is displayed in a case where function switch F4 corresponding to guidance icon 13 displayed on display portion 212 is pressed in standard picture 301 described above. Then, a vehicular body setting picture 310 in which setting in connection with a vehicular body can be made among user mode pictures is displayed.

In vehicular body setting picture 310, here, items of "economy mode setting" 311 for setting details of the economy mode of the operation mode, "breaker setting" 312 for setting details of the breaker mode, "attachment setting" 313 for setting details of the attachment mode, and "idle reduction time period setting" 314 for setting an idle reduction time period which is a condition for performing an idle reduction operation are shown.

The operator can make detailed setting of the item corresponding to a position of a cursor 315, by operating cursor 315 and making selection by selecting an instruction switch provided at a position in a lower portion of the picture.

In the present example, a case where cursor 315 is used to select an item regarding idle reduction time period setting will be described. In the present example, a case where "OFF" is set as idle reduction time period setting is shown by way of example.

As shown in FIG. 6 (B), here, an idle reduction time period setting picture 320 is shown. When cursor 315 is moved over the item of "idle reduction time period setting" 314 displayed on display portion 212 in vehicular body setting picture 310 described above and a function switch indicating selection is pressed, idle reduction time period setting picture 320 is displayed.

In idle reduction time period setting picture 320, a plurality of idle reduction time periods are provided to allow setting. In the present example, a case where "OFF" and "5 minutes" to "9 minutes" as a setting range from which selective setting can be made can be set is shown by way of example. It is noted that a time period longer than "9 minutes" can be set by further moving downward a cursor 325.

The operator operates cursor 325 and makes selection, so that a desired idle reduction time period can be set. Namely, information on the set idle reduction time period is input from monitor apparatus 21 to idle reduction time period setting portion 52 and set in idle reduction time period setting portion 52.

As shown in FIG. 6 (C), here, a setting table for setting an idle reduction time period is shown.

Here, by way of example, a setting table in which 12 patterns of setting can be made is shown and a case where "60 minutes" can be set as a longest idle reduction time period is shown.

Though a case where an idle reduction time period is selected from among a plurality of items and then set has been described as an interface for setting an idle reduction time period in the present example, limitation to such a scheme is not particularly intended. For example, such an interface that a time bar defining a longest length of an idle reduction time period and a cursor movable to any position associated with the time bar are displayed and an idle reduction time period is set in accordance with a position of the cursor with respect to the time bar may be adopted. Alternatively, in setting of an idle reduction time period, a scheme may be such that any time period is set by an input of a numeric value by the operator.

<Position State>

Figure 7:
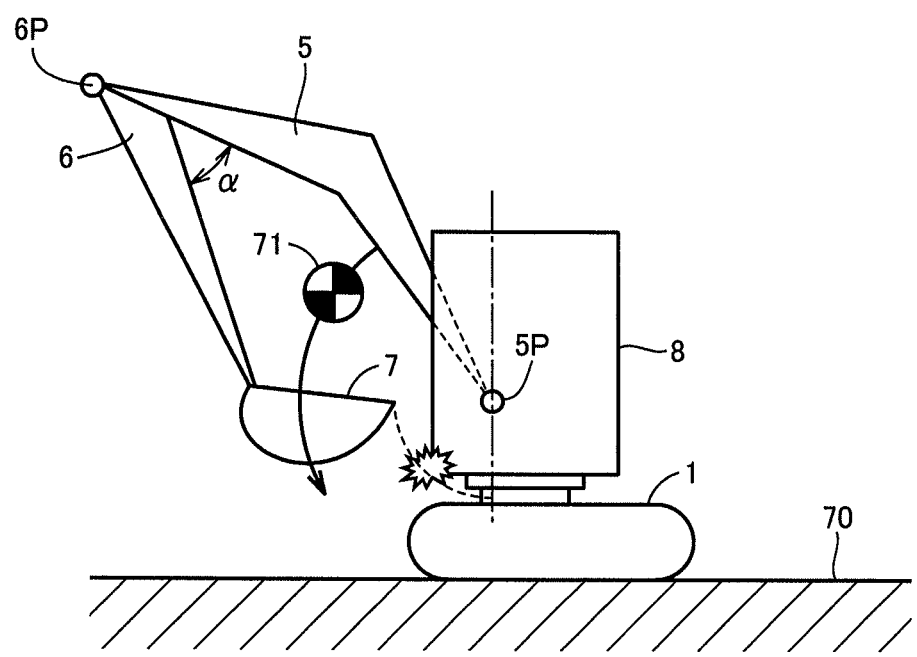
FIG. 7 is a diagram illustrating one example of a position state of the work vehicle based on the first embodiment.

FIG. 7 is a diagram illustrating one example of a position state of the work vehicle based on the first embodiment.

Referring to FIG. 7, in the present example, a state that work vehicle 101 is at rest with respect to a horizontal ground 70 which is not sloped is shown.

Here, boom 5 is pivotably provided around a pivot center 5P. Arm 6 is pivotably provided around a pivot center 6P.

In the present example, a state of rest at an angle $\alpha$ is shown as an angle formed between boom 5 and arm 6, that is, an angle of arm 6 with respect to boom 5 (also referred to as an arm angle).

Though a case that an angle formed between a lower plate of boom 5 and a lower plate of arm 6 is defined as an arm angle is described by way of example in the present example, limitation to that angle is not intended, and for example, an angle at which a straight line connecting pivot center 5P of boom 5 and pivot center 6P of arm 6 to each other and a straight line connecting pivot center 6P of arm 6 and a pivot center (not shown) of bucket 7 to each other intersect with each other may be defined as an arm angle.

In the present example, a gravity center position 71 of the work implement as a whole is shown by way of example and boom 5 acts in a direction approaching gravity center position 71. Therefore, boom 5 may move downward (naturally lowers) around pivot center 5P, for example, due to gravity representing one of external factors.

Here, in a case of an arm angle as bending arm 6 with respect to boom 5 (in the present example, not greater than angle $\alpha$), when boom 5 moves downward around pivot center 5P, bucket 7 may interfere with cab 8 of the vehicle main body.

In a case of an arm angle as moving arm 6 away from boom 5 (in the present example, greater than angle $\alpha$), even when boom 5 moves downward around pivot center 5P, bucket 7 is less likely to interfere with cab 8.

Therefore, in the first embodiment, position determination portion 54 determines whether or not bucket 7 may interfere with the vehicle main body when boom 5 moves downward (naturally lowers) due to an external factor, based on a position state of rest of work implement 4.

Specifically, position determination portion 54 determines whether or not an arm angle exceeds a prescribed angle. When position determination portion 54 determines that an arm angle exceeds a prescribed angle, it determines that bucket 7 will not interfere with the vehicle main body due to an external factor from a position state of rest of work implement 4 and makes determination as position OK. When position determination portion 54 determines that an arm angle is not greater than a prescribed angle, it determines that bucket 7 may interfere with the vehicle main body due to an external factor from the position state of rest of work implement 4 and makes determination as position NG.

<Idle Reduction Control Processing>

Figure 8:
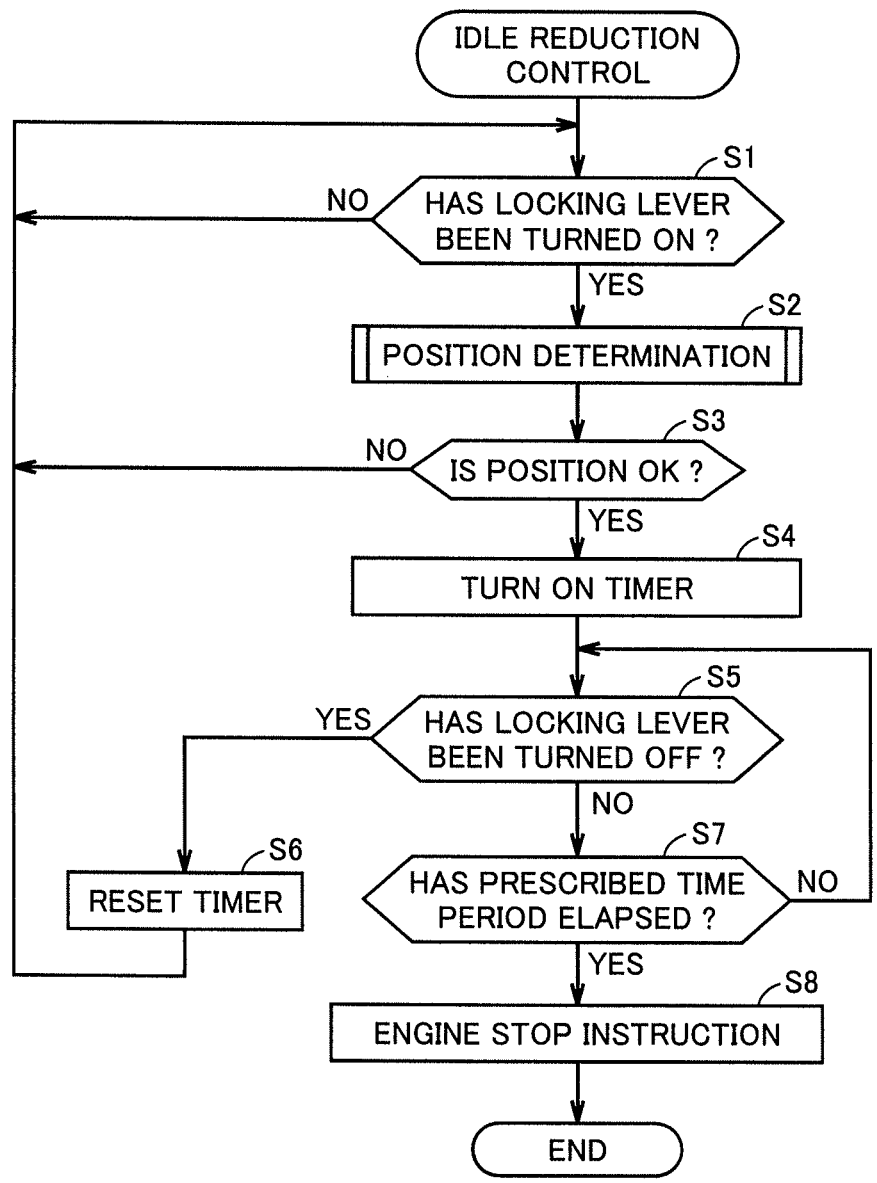
FIG. 8 is a flowchart of an idle reduction control unit 51 based on the first embodiment.

FIG. 8 is a flowchart of idle reduction control unit 51 based on the first embodiment.

As shown in FIG. 8, idle reduction control unit 51 determines whether or not locking lever 20 has been locked (turned on) (step S1). Specifically, operation state detection portion 60 detects locking of locking lever 20 through pressure switch 42 and outputs that fact to idle reduction timer 56. Idle reduction timer 56 determines that locking lever 20 has been locked (turned on), based on a detection signal input from operation state detection portion 60.

Then, when idle reduction control unit 51 determines in step S1 that locking lever 20 has been locked (turned on) (YES in step S1), it performs position determination processing (step S2). Specifically, idle reduction execution portion 57 instructs position determination portion 54 to perform processing for determining a position state of rest of work implement 4 based on an angle sensor value input from angle sensor 39.

In the present example, by way of example, position determination portion 54 performs processing for determining a position state of rest of work implement 4 based on an arm angle from angle sensor 39 provided in the cylinder for arm.

Figure 9:
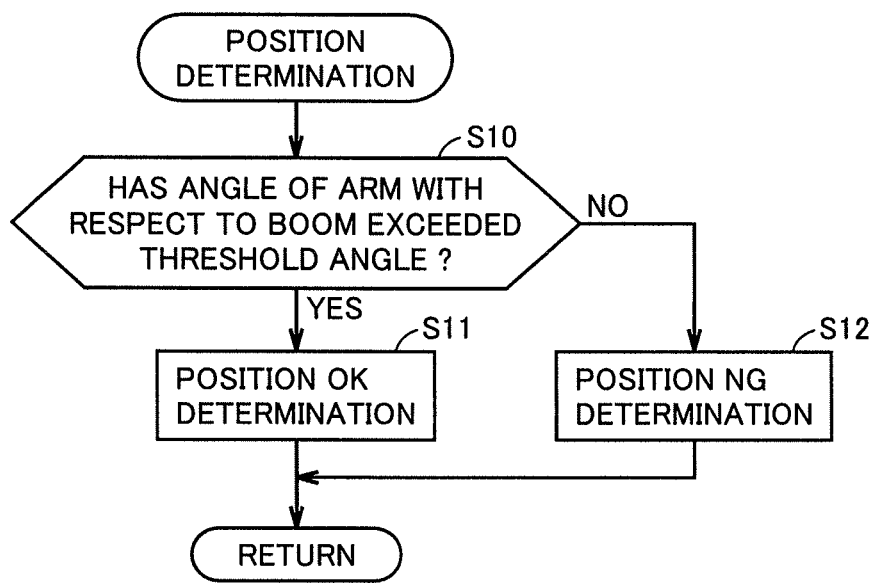
FIG. 9 is a flowchart of a position determination portion 54 based on the first embodiment.

FIG. 9 is a flowchart of position determination portion 54 based on the first embodiment.

As shown in FIG. 9, position determination portion 54 determines whether or not an angle of arm 6 with respect to boom 5 (an arm angle) exceeds a threshold value $\alpha$ (step S10). Specifically, position determination portion 54 determines whether or not an arm angle exceeds threshold value $\alpha$ based on comparison between an arm angle obtained from angle sensor 39 and threshold value $\alpha$.

When position determination portion 54 determines in step S10 that an angle of arm 6 with respect to boom 5 exceeds threshold value $\alpha$ (YES in step S10), determination as position OK is made (step S11). Namely, it is determined that bucket 7 is less likely to interfere, that is, will not interfere with the vehicle main body due to an external factor from a position state of rest of work implement 4.

Then, the process ends (return).

When position determination portion 54 determines in step S10 that an angle of arm 6 with respect to boom 5 does not exceed threshold value $\alpha$, that is, it is not greater than threshold value $\alpha$ (NO in step S10), determination as position NG is made (step S12). Namely, it is determined that bucket 7 may interfere with the vehicle main body due to an external factor from a position state of rest of work implement 4.

Then, the process ends (return).

Referring again to FIG. 8, idle reduction control unit 51 determines whether or not position OK determination has been made based on a result of determination by position determination portion 54 (step S3). Specifically, idle reduction execution portion 57 determines whether or not a signal indicating that position OK determination has been made is received from position determination portion 54.

When idle reduction control unit 51 determines that determination as position OK has been made based on a result of determination by position determination portion 54 (YES in step S3), idle reduction control unit 51 starts idle reduction timer 56 (timer ON) (step S4). Specifically, idle reduction execution portion 57 instructs idle reduction timer 56 to count time in response to input of a detection signal from operation state detection portion 60. Then, idle reduction timer 56 outputs a counted timer value to idle reduction execution portion 57.

Then, idle reduction control unit 51 determines whether or not locking lever 20 has been turned off (OFF) (step S5). Specifically, operation state detection portion 60 detects unlocking (turn-off) of locking lever 20 through pressure switch 42 and outputs that fact to idle reduction timer 56. Then, idle reduction timer 56 determines that locking lever 20 has been unlocked based on input of a detection signal from operation state detection portion 60.

Then, when idle reduction control unit 51 has determined in step S5 that locking lever 20 has been unlocked (YES in step S5), it resets idle reduction timer 56 (step S6). Specifically, idle reduction timer 56 stops counting of time based on input of the detection signal and resets the counter value.

Then, the process returns to step S1 and idle reduction control unit 51 again stands by until locking lever 20 is locked (turned on).

When idle reduction control unit 51 determines in step S5 that locking lever 20 has not been unlocked (NO in step S5), idle reduction control unit 51 determines whether or not a prescribed time period has elapsed (step S7). Specifically, idle reduction execution portion 57 determines whether or not the timer value has exceeded an idle reduction time period based on the idle reduction time period which is the prescribed time period set by idle reduction time period setting portion 52 and a timer value input from idle reduction timer 56. Then, idle reduction execution portion 57 determines that the prescribed time period has elapsed when the timer value has exceeded the idle reduction time period.

When idle reduction control unit 51 determines in step S7 that the prescribed time period has elapsed (YES in step S7), it outputs an engine stop instruction (step S8). Specifically, idle reduction execution portion 57 outputs an engine stop signal to engine controller 38. Thus, engine controller 38 instructs governor motor 37 to stop engine 36.

Then, idle reduction control unit 51 ends the process (end).

With such processing, when an idling state of work vehicle 101 has continued for a prescribed time period, engine 36 of the work vehicle 101 can automatically be stopped and energy consumption and noise can be suppressed.

On the other hand, when idle reduction control unit 51 determines in step S7 that the prescribed time period has not elapsed (NO in step S7), the process returns to step S5 and idle reduction control unit 51 repeats the processing above until the prescribed time period elapses.

When idle reduction control unit 51 makes determination as position NG in step S3 based on a result of determination by position determination portion 54 (NO in step S3), the process returns to step S1.

In the processing, that is, when an idling state of work vehicle 101 continues and idle reduction timer 56 starts counting (time count) and when it is determined that bucket 7 may interfere with the vehicle main body due to an external factor from a position state of rest of work implement 4 through position determination processing by position determination portion 54, counting by idle reduction timer 56 is not started.

Therefore, idle reduction timer 56 does not start counting until it is determined that bucket 7 will not interfere with the vehicle main body due to an external factor from a position state of rest of work implement 4 through the position determination processing by position determination portion 54. Namely, engine 36 of work vehicle 101 is not stopped by the idle reduction operation. Namely, when it is determined that bucket 7 may interfere with the vehicle main body due to an external factor from a position state of rest of work implement 4, control is carried out such that the idle reduction operation is not performed.

Thus, interference of bucket 7 with the vehicle main body can be suppressed when an operation of the work vehicle is stopped owing to the idle reduction function.

Though a scheme of performing position determination processing after step S1 has been described in the present example, limitation to the case that it is performed at that timing is not particularly intended. If only the idle reduction operation can be prevented from being performed when it is determined that bucket 7 may interfere with the vehicle main body due to an external factor from a position state of rest of work implement 4 through the position determination processing, any timing may be acceptable. For example, the processing may be performed before step S1 or the processing may be performed after step S7.

A person skilled in the art could calculate threshold value $\alpha$ used in the position determination processing by conducting in advance an experiment or simulation of the possibility of interference of bucket 7 with the vehicle main body due to an external factor from a position state of rest of work implement 4. Naturally, a margin to some extent can also be provided for a value calculated in the experiment and the like.

Though a determination scheme that position determination portion 54 determines whether or not an arm angle exceeds threshold value $\alpha$ based on comparison between an arm angle obtained from angle sensor 39 and threshold value $\alpha$ has been described in the present example, limitation to the scheme is not particularly intended and determination can also be made with another determination scheme. For example, determination as position OK or position NG may be made by adding or subtracting an amount of operation of work implement levers 18 and 19 which operates arm 5 and based on whether or not the added or subtracted amount of operation exceeds an amount defined as a threshold value.

(First Variation)

FIG. 10 is a diagram illustrating a threshold value based on a first variation of the first embodiment.

Referring to FIG. 10, here, a table changing setting of a threshold value based on a type of an arm is shown.

In the present example, by way of example, a case that threshold values are provided in correspondence with two types of arms P and Q different in characteristics, respectively, is shown. For example, in a case that a length representing a characteristic is different, a threshold value $\alpha 0$ is set for arm P and a threshold value $\alpha 1$ is set for arm Q.

In the first variation, a threshold value is set in accordance with a type of an arm of work implement 4 and then position determination processing is performed.

Specifically, in the flow in FIG. 9, position determination portion 54 determines whether or not an angle of arm 6 (an arm angle) with respect to boom 5 in the case of arm P exceeds threshold value $\alpha 0$.

When position determination portion 54 determines that an angle of arm 6 with respect to boom 5 exceeds threshold value $\alpha 0$, determination as position OK is made. Namely, it is determined that bucket 7 will not interfere with the vehicle main body due to an external factor from a position state of rest of work implement 4.

When position determination portion 54 determines that an angle of arm 6 with respect to boom 5 does not exceed threshold value $\alpha 0$, that is, it is not greater than threshold value $\alpha 0$, determination as position NG is made. Namely, it is determined that bucket 7 may interfere with the vehicle main body due to an external factor from a position state of rest of work implement 4.

Position determination portion 54 determines whether or not an angle of arm 6 (an arm angle) with respect to boom 5 in the case of arm Q exceeds threshold value α1.

When position determination portion 54 determines that an angle of arm 6 with respect to boom 5 exceeds threshold value α1, determination as position OK is made. Namely, it is determined that bucket 7 will not interfere with the vehicle main body due to an external factor from a position state of rest of work implement 4.

When position determination portion 54 determines that an angle of arm 6 with respect to boom 5 does not exceed threshold value α1, that is, it is not greater than threshold value α1, determination as position NG is made. Namely, it is determined that bucket 7 may interfere with the vehicle main body due to an external factor from a position state of rest of work implement 4.

In the present example, though a case of change in threshold value for arms P and Q different in length has been described by way of example, limitation to a length is not intended and a person skilled in the art could change a threshold value to an appropriate value as appropriate based on other characteristics, a material, or a weight.

A threshold value can also be changed in accordance with a length of a boom without being limited to an arm. A threshold value can also be changed based on combination between an arm and a boom or a type of other components.

Regarding setting of a threshold value, it is assumed that a manager of work vehicle 101 sets a threshold value with reference to a table. A manager may input a numeric value defined as a threshold value or can also set a type of an arm and then main controller 50 can automatically set a threshold value with reference to the table.

<Second Variation>

In the first embodiment above, a case that whether or not bucket 7 may interfere with the vehicle main body when boom 5 moves downward (naturally lowers) due to an external factor while work vehicle 101 is at rest with respect to horizontal ground 70 which is not sloped in FIG. 7 is determined has been described.

A state of rest of work vehicle 101 is not limited to horizontal ground 70 and a sloped geographical feature is also possible as an external factor.

<Position State>

Figure 11:
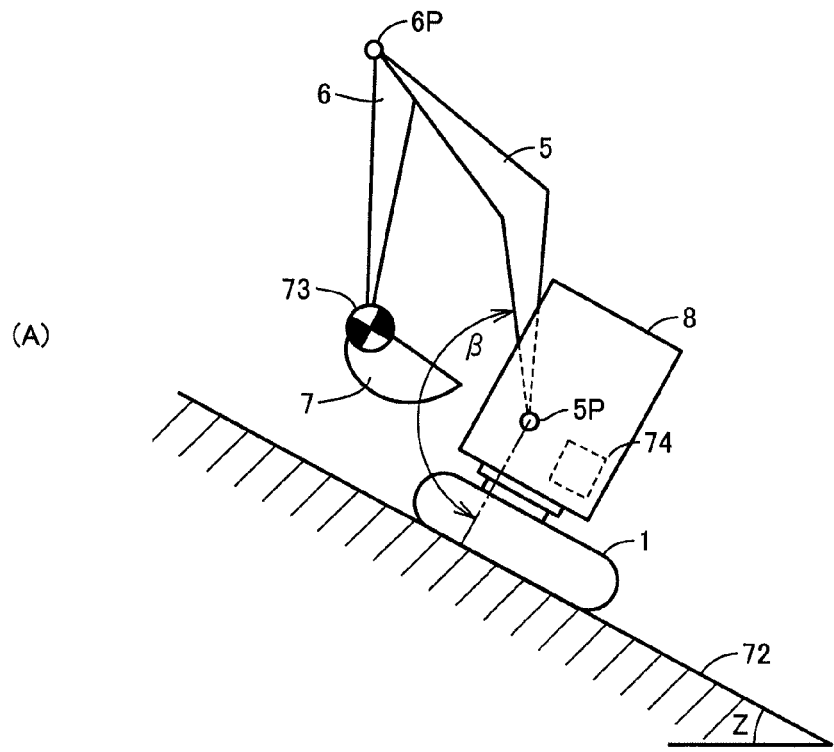
FIG. 11 is a diagram illustrating one example of a position state of the work vehicle based on a second variation of the first embodiment.
Figure 11:
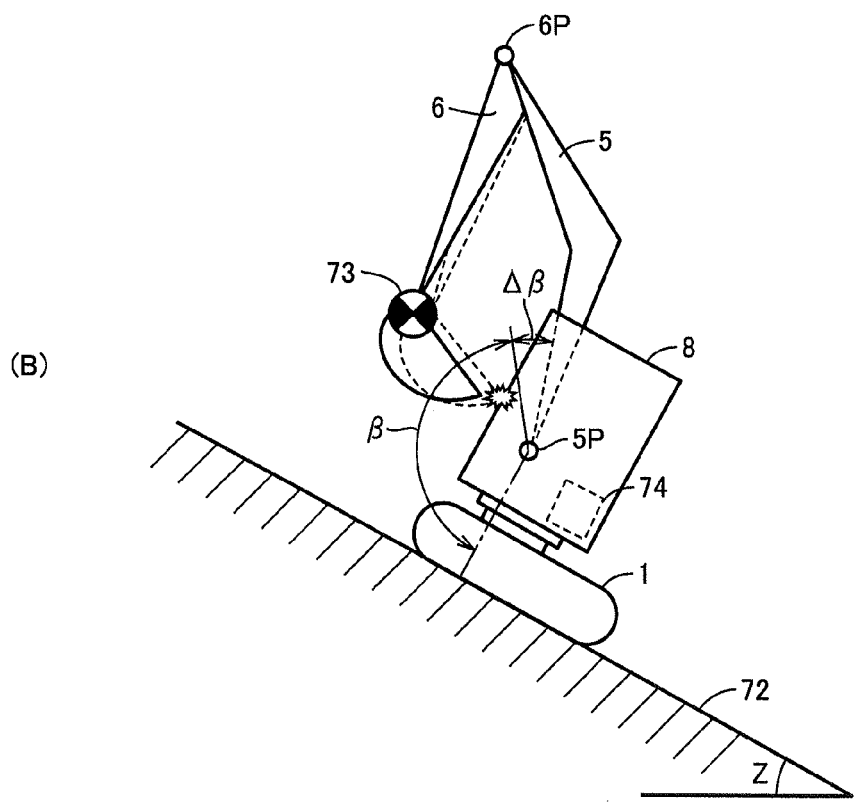

FIG. 11 is a diagram illustrating one example of a position state of the work vehicle based on a second variation of the first embodiment.

Referring to FIG. 11, in the present example, a state that work vehicle 101 is at rest with respect to a ground 72 having an inclination angle (an angle of elevation) Z with respect to the horizontal line is shown.

Here, boom 5 is pivotably provided around pivot center 5P. Arm 6 is pivotably provided around pivot center 6P.

In the present example, an angle formed between boom 5 and the vehicle main body is defined as an angle with respect to boom 5 (a boom angle) by way of example in a case that a normal from pivot center 5P of boom 5 to lower carrier 1 is defined as the reference. It is noted that how an angle formed between boom 5 and the vehicle main body is defined is not limited to that case, and for example, the angle can also be defined as an angle with respect to boom 5 in a case that a horizontal line in parallel to lower carrier 1 is defined as the reference.

FIG. 11 (A) shows a state of rest at an angle β as an angle of boom 5 (a boom angle), with a normal from pivot center 5P to lower carrier 1 being defined as the reference.

In the present example, by way of example, a case that a gravity center position 73 of arm 6 and bucket 7 is located vertically directly under pivot center 6P of arm 6 is shown, and arm 6 maintains a rest state.

FIG. 11 (B) shows a state of rest at angle β+Δβ(>0)=β1 as an angle of boom 5 with the normal from pivot center 5P to lower carrier 1 being defined as the reference.

In the present example, by way of example, a case that gravity center position 73 of arm 6 and bucket 7 is located on the left relative to a point vertically directly under pivot center 6P of arm 6 is shown.

In that state, since gravity center position 73 deviates to the left instead of being located vertically directly under pivot center 6P of arm 6, arm 6 and bucket 7 may come closer to the right, that is, toward cab 8, with pivot center 6P of arm 6 being defined as the reference. Bucket 7 may thus interfere with cab 8 of the vehicle main body.

When gravity center position 73 is located on the right relative to the point vertically directly under pivot center 6P of arm 6, bucket 7 will move in a direction away from cab 8 and hence bucket 7 will not interfere with cab 8.

In the second variation, position determination portion 54 determines whether or not bucket 7 may interfere with the vehicle main body when arm 6 moves (can move) due to an external factor. In the present example, by way of example, position determination portion 54 performs processing for determining a position state of rest of work implement 4 based on a boom angle from angle sensor 39 provided in the cylinder for boom.

Other processing by idle reduction control unit 51 is the same as described in the first embodiment above.

Figure 12:
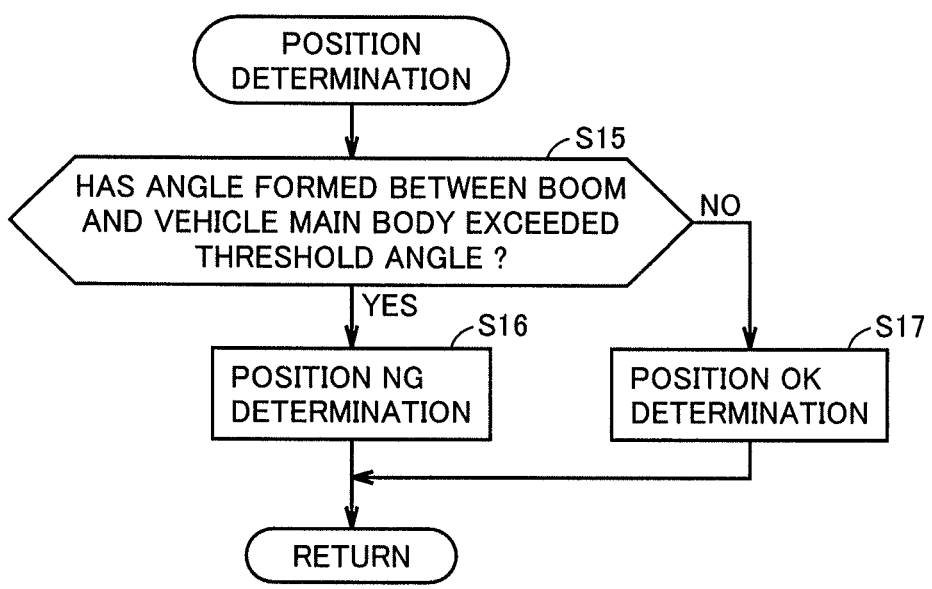
FIG. 12 is a flowchart of position determination portion 54 based on the second variation of the first embodiment.

FIG. 12 is a flowchart of position determination portion 54 based on the second variation of the first embodiment.

As shown in FIG. 12, position determination portion 54 determines whether or not an angle formed between boom 5 and the vehicle main body (a boom angle) exceeds threshold value β (step S15). Specifically, position determination portion 54 determines whether or not a boom angle exceeds threshold value β based on comparison between a boom angle obtained from angle sensor 39 and threshold value β.

When position determination portion 54 determines in step S15 that an angle formed between boom 5 and the vehicle main body exceeds threshold value β (YES in step S15), determination as position NG is made (step S16). Namely, it is determined that bucket 7 may interfere with the vehicle main body due to an external factor from a position state of rest of work implement 4.

Then, the process ends (return).

When position determination portion 54 determines in step S15 that an angle formed between boom 5 and the vehicle main body does not exceed threshold value β, that is, it is not greater than threshold value β (NO in step S15), determination as position OK is made (step S17). Namely, it is determined that bucket 7 is less likely to interfere, that is, will not interfere, with the vehicle main body due to an external factor from a position state of rest of work implement 4.

Then, the process ends (return).

In the processing, that is, when an idling state of work vehicle 101 continues and idle reduction timer 56 starts counting (time count) and when it is determined that bucket 7 may interfere with the vehicle main body due to an external factor (in the present example, slope of a geographic feature) from a position state of rest of work implement 4 through position determination processing by position determination portion 54, counting by idle reduction timer 56 is not started.

Therefore, idle reduction timer 56 does not start counting until it is determined that bucket 7 will not interfere with the vehicle main body due to an external factor (in the present example, slope of a geographic feature) from a position state of rest of work implement 4 through the position determination processing by position determination portion 54. Namely, engine 36 of work vehicle 101 is not stopped by the idle reduction operation. Namely, when it is determined that bucket 7 may interfere with the vehicle main body due to an external factor (in the present example, slope of a geographic feature) from a position state of rest of work implement 4, control is carried out such that the idle reduction operation is not performed.

Thus, interference of bucket 7 with the vehicle main body when an operation of the work vehicle is stopped owing to the idle reduction function can be suppressed.

A person skilled in the art could calculate threshold value $\beta$ used in the position determination processing by conducting in advance an experiment or simulation of the possibility of interference of bucket 7 with the vehicle main body due to an external factor from a position state of rest of work implement 4. In fact, since inclination angle (angle of elevation) Z with respect to the horizontal line at which working can be performed in a safe state is defined in accordance with a type of work vehicle 101, calculation through an experiment or simulation of the possibility of interference of bucket 7 with the vehicle main body in a position state of rest of work vehicle 101 with respect to ground 72 having defined inclination angle (angle of elevation) Z is desirable. Naturally, a margin to some extent can also be provided for a value calculated in the experiment and the like.

Though a case that threshold value $\beta$ for a boom angle is set in a fixed manner in consideration of deviation of gravity center position 73 of arm 6 and bucket 7 from the point vertically directly under due to inclination angle Z has been described in the present example, an inclination angle varies depending on a shape of the ground and hence threshold value $\beta$ may be adjusted in accordance with the inclination angle. Specifically, sensing means for sensing an inclination angle (angle of elevation) of the ground such as a gyro sensor 74 may be provided, and threshold value $\beta$ for determining the possibility of interference of bucket 7 with the vehicle main body due to an external factor from a position state of rest of work implement 4 may dynamically be varied based on a result of sensing, and then the position determination processing may be performed. Similarly in other embodiments and variations as well, a threshold value used for position determination processing can be adjusted in consideration of an inclination angle.

(Third Variation)

In the second variation above, the possibility of interference with cab 8 due to pivot of arm 6 around pivot center 6P in accordance with a slope of a geographical feature as an external factor has been described.

In a third variation, a case that whether or not bucket 7 may interfere with the vehicle main body due to pivot of arm 6 and lowering of boom 5 will be described.

Figure 13:
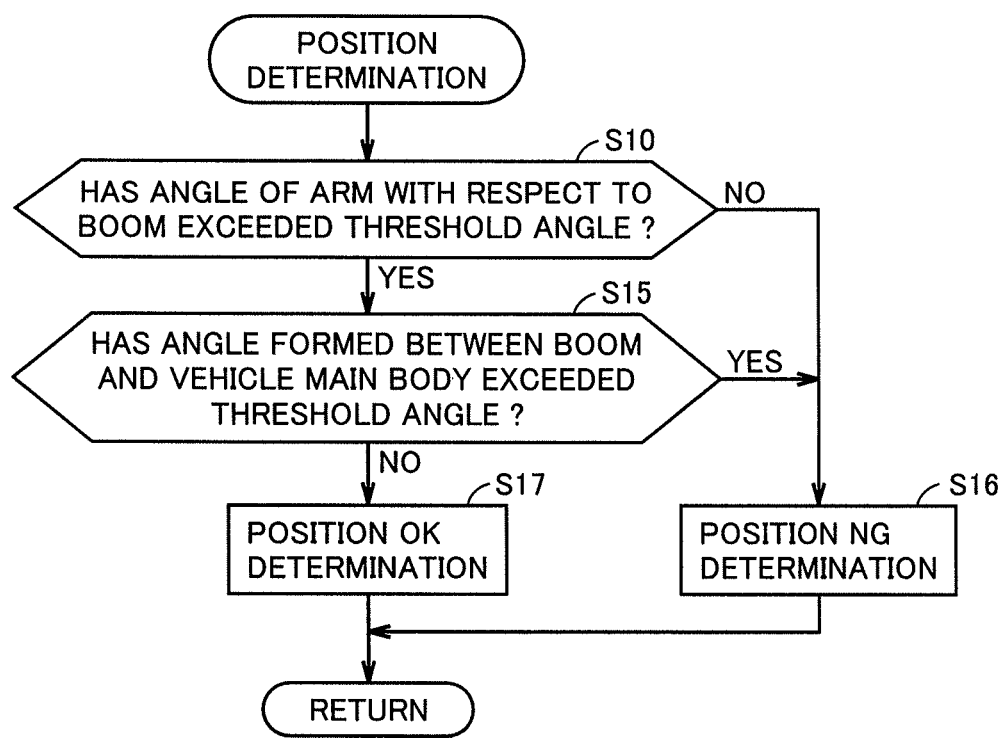
FIG. 13 is a flowchart of position determination portion 54 based on a third variation of the first embodiment.

FIG. 13 is a flowchart of position determination portion 54 based on the third variation of the first embodiment.

As shown in FIG. 13, position determination portion 54 determines whether or not an angle of arm 6 with respect to boom 5 (an arm angle) exceeds threshold value $\alpha$ (step S10). Specifically, position determination portion 54 determines whether or not an arm angle exceeds threshold value $\alpha$ based on comparison between an arm angle obtained from angle sensor 39 and threshold value $\alpha$.

When position determination portion 54 determines in step S10 that an angle of arm 6 with respect to boom 5 exceeds threshold value $\alpha$ (YES in step S10), position determination portion 54 then determines whether or not an angle formed between boom 5 and the vehicle main body (a boom angle) exceeds threshold value $\beta$ (step S15). Specifically, position determination portion 54 determines whether or not a boom angle exceeds threshold value $\beta$ based on comparison between a boom angle obtained from angle sensor 39 and threshold value $\beta$.

When position determination portion 54 determines in step S15 that an angle formed between boom 5 and the vehicle main body does not exceed threshold value $\beta$, that is, it is not greater than threshold value $\beta$ (NO in step S15), determination as position OK is made (step S17). Namely, it is determined that bucket 7 will not interfere with the vehicle main body due to an external factor from a position state of rest of work implement 4.

When position determination portion 54 determines in step S15 that an angle formed between boom 5 and the vehicle main body exceeds threshold value $\beta$ (YES in step S15), determination as position NG is made (step S16). Namely, it is determined that bucket 7 may interfere with the vehicle main body due to an external factor from a position state of rest of work implement 4.

Then, the process ends (return).

When position determination portion 54 determines in step S10 that an angle of arm 6 with respect to boom 5 does not exceed threshold value $\alpha$, that is, it is not greater than threshold value $\alpha$ (NO in step S10), determination as position NG is made (step S17). Namely, it is determined that bucket 7 may interfere with the vehicle main body due to an external factor from a position state of rest of work implement 4.

Then, the process ends (return).

In the processing, that is, when an idling state of work vehicle 101 continues and idle reduction timer 56 starts counting (time count) and when it is determined that bucket 7 may interfere with the vehicle main body due to an external factor (gravity and a slope of a geographical feature) from a position state of rest of work implement 4 through position determination processing by position determination portion 54, counting by idle reduction timer 56 is not started.

Therefore, idle reduction timer 56 does not start counting until it is determined that bucket 7 will not interfere with the vehicle main body due to an external factor (gravity and a slope of a geographical feature) from a position state of rest of work implement 4 through the position determination processing by position determination portion 54. Namely, engine 36 of work vehicle 101 is not stopped by the idle reduction operation. Namely, when it is determined that bucket 7 may interfere with the vehicle main body due to an external factor (gravity and a slope of a geographical feature) from a position state of rest of work implement 4, control is carried out such that the idle reduction operation is not performed.

Thus, interference of bucket 7 with the vehicle main body when an operation of the work vehicle is stopped owing to the idle reduction function can be suppressed.

Though a scheme that position determination portion 54 determines whether or not bucket 7 may interfere with the vehicle main body due to an external factor from a position state of rest of work implement 4 by making use of a boom angle and an arm angle has been described in the embodiment above, limitation to the angle is not intended and highly accurate determination may be made by making use also of a bucket angle, or a person skilled in the art can naturally make determination by using other parameters.

Second Embodiment

In the first embodiment above, a scheme that position determination portion 54 of idle reduction control unit 51 determines whether or not bucket 7 may interfere with the vehicle main body due to an external factor has been described.

Work vehicle 101 is provided with an interference prevention function allowing prevention of interference with the vehicle main body during working. The interference prevention function is a function to restrict an operation state of work implement 4 in a case that bucket 7 may interfere with the vehicle main body.

Figure 14:
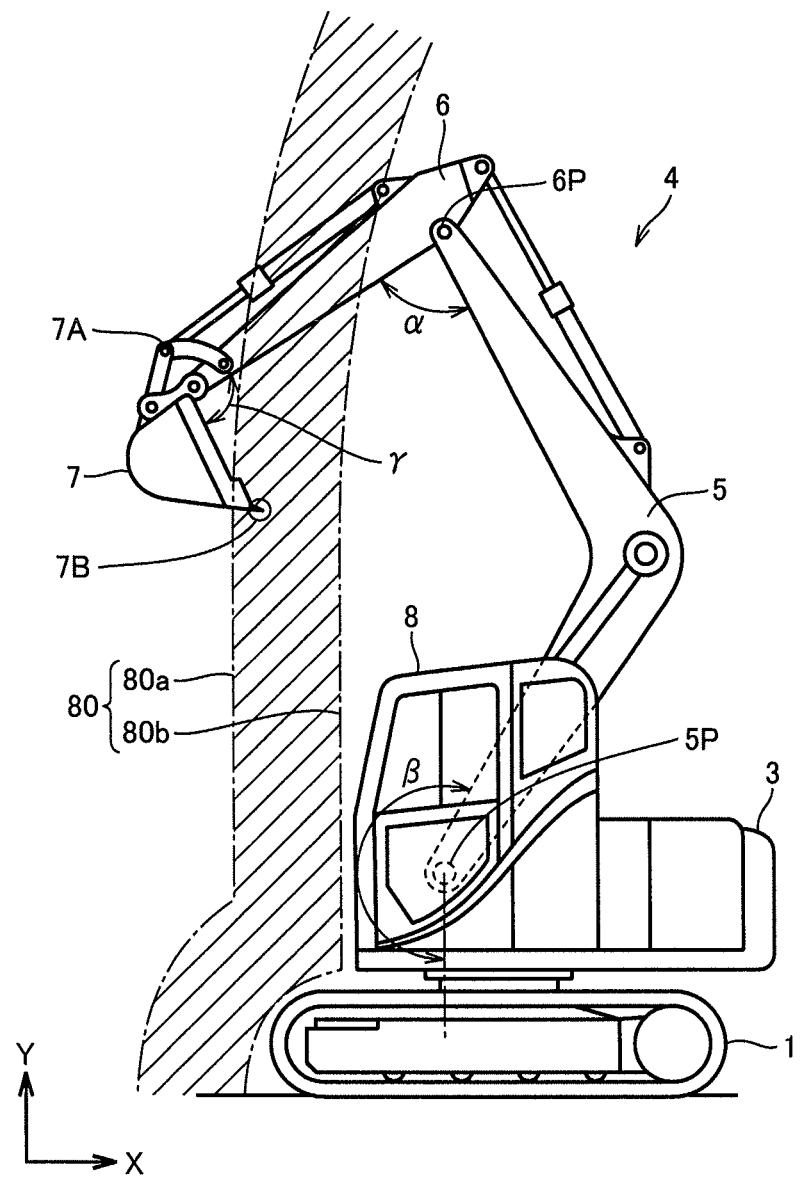
FIG. 14 is a diagram illustrating an interference prevention function based on a second embodiment.

FIG. 14 is a diagram illustrating the interference prevention function based on a second embodiment.

As shown in FIG. 14, a state of work vehicle 101 in a two-dimensional coordinate defined by an X axis and an Y axis is shown here. The X axis is an axis in parallel to lower carrier 1 of work vehicle 101 and the Y axis is an axis perpendicular to the X axis. Here, a case that a position of a tip end portion 7B of bucket 7 (for example, a tooth portion of bucket 7) is located within an interference prevention region 80 in which the interference prevention function is activated is shown.

Interference prevention region 80 is provided around work vehicle 101. Specifically, interference prevention region 80 is set within a prescribed distance from an outer peripheral surface of the vehicle main body of work vehicle 101. In the present example, by way of example, a range between an interference prevention start line 80a and an interference prevention end line 80b is shown as interference prevention region 80.

Regarding this interference prevention region 80, when tip end portion 7B of bucket 7 goes beyond interference prevention start line 80a and enters interference prevention region 80, an operation state of work implement 4 is restricted by the interference prevention function. Specifically, an operation speed of work implement 4 is slowed down. By restricting an operation state of work implement 4, an erroneous operation of interference of tip end portion 7B of bucket 7 with the vehicle main body due to working near the outer peripheral surface of the vehicle main body resulting from an operation of work implement levers 18 and 19 can be suppressed.

When tip end portion 7B of bucket 7 enters interference prevention region 80 and thereafter it is about to go beyond interference prevention end line 80b (in the present example, bucket 7 is trying to move further toward cab 8), the interference prevention function restricts an operation state of bucket 7 and stops the operation. Specifically, in operating work implement 4 by using work implement levers 18 and 19, an input command to move tip end portion 7B of bucket 7 toward cab 8 beyond interference prevention end line 80b is canceled (inactivated). The function can reliably suppress interference of bucket 7, that is, tip end portion 7B of bucket 7, with the vehicle main body due to working by work implement 4. When tip end portion 7B of bucket 7 tries to go beyond interference prevention end line 80b and the operation of work implement 4 is stopped, only an input command using work implement levers 18 and 19 moving tip end portion 7B of bucket 7 away from interference prevention end line 80b is accepted.

In this regard, the interference prevention function is a function to suppress interference of bucket 7 with the vehicle main body due to working by work implement 4 and it is activated in the vicinity of the vehicle main body.

When an operation of the work vehicle is stopped in the vicinity of the vehicle main body and when boom 5 moves downward (for example, naturally lowers) due to such an external factor as gravity from a position state of rest of work implement 4, interference with the vehicle main body is also likely.

Therefore, in the second embodiment, a scheme for suppressing interference of tip end portion 7B of bucket 7 with the vehicle main body by not stopping engine 36 through the idle reduction operation when tip end portion 7B of bucket 7 is located within interference prevention region 80 of the interference prevention function will be described.

<Construction of Control System>

Figure 15:
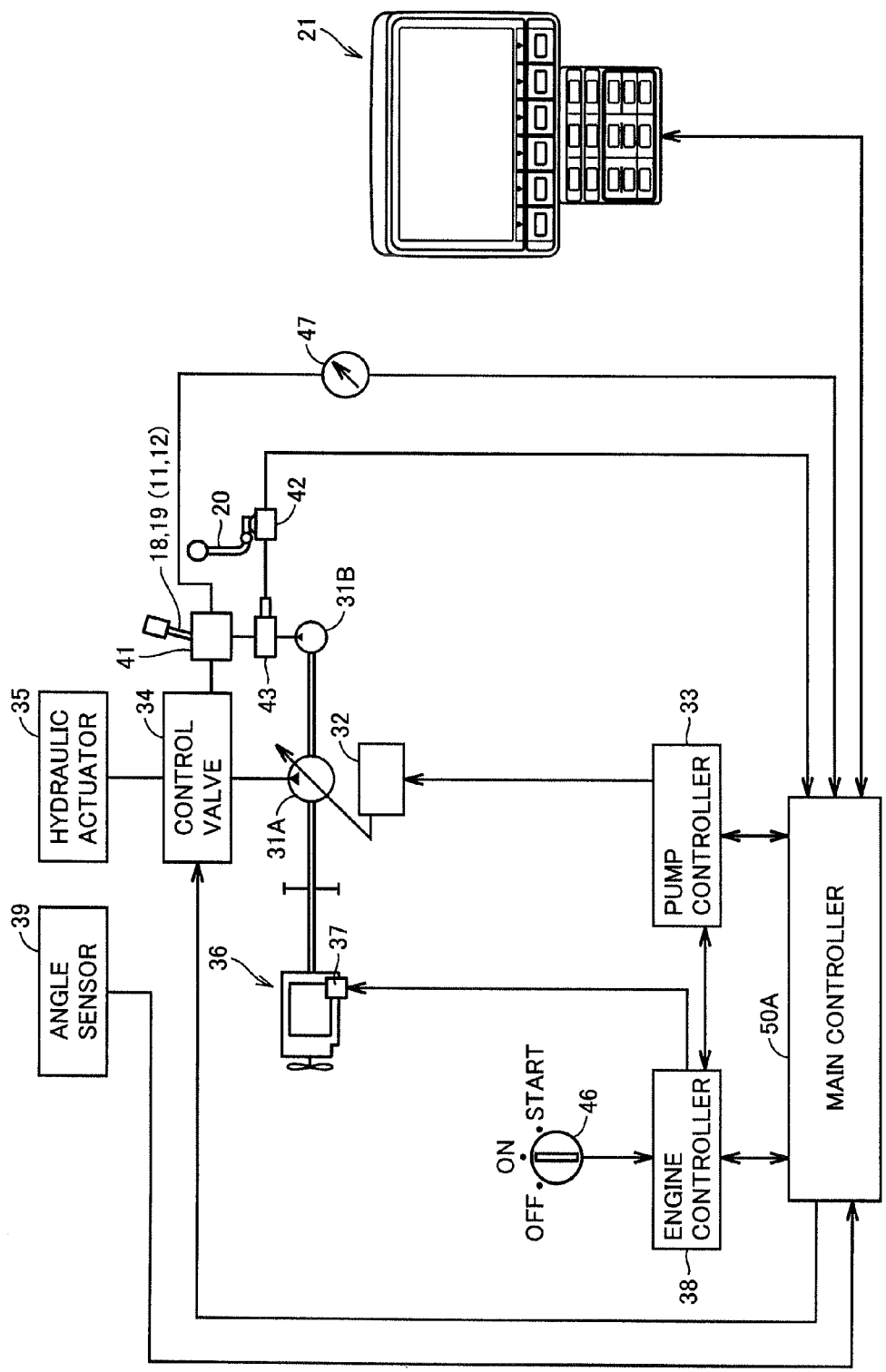
FIG. 15 is a simplified diagram showing a configuration of the control system of work vehicle 101 based on the second embodiment.

FIG. 15 is a simplified diagram showing a configuration of the control system of work vehicle 101 based on the second embodiment.

As shown in FIG. 15, difference from the control system of work vehicle 101 in FIG. 3 resides in change from main controller 50 to a main controller 50A. Since other features are the same, detailed description thereof will not be repeated.

Main controller 50A senses a lever operation signal in accordance with an operation state of work implement levers 18 and 19 through pressure sensor 47 and gives an instruction to control valve 34 as necessary. Specifically, main controller 50A instructs control valve 34 to adjust input of a pilot pressure in accordance with an operation direction and/or an amount of operation of work implement levers 18 and 19 or prohibit input of a pilot pressure when bucket 7 is located within the interference prevention region owing to the interference prevention function. Thus, the interference prevention function can restrict an operation state of work implement 4 within the interference prevention region.

<Functional Block Diagram>

Figure 16:
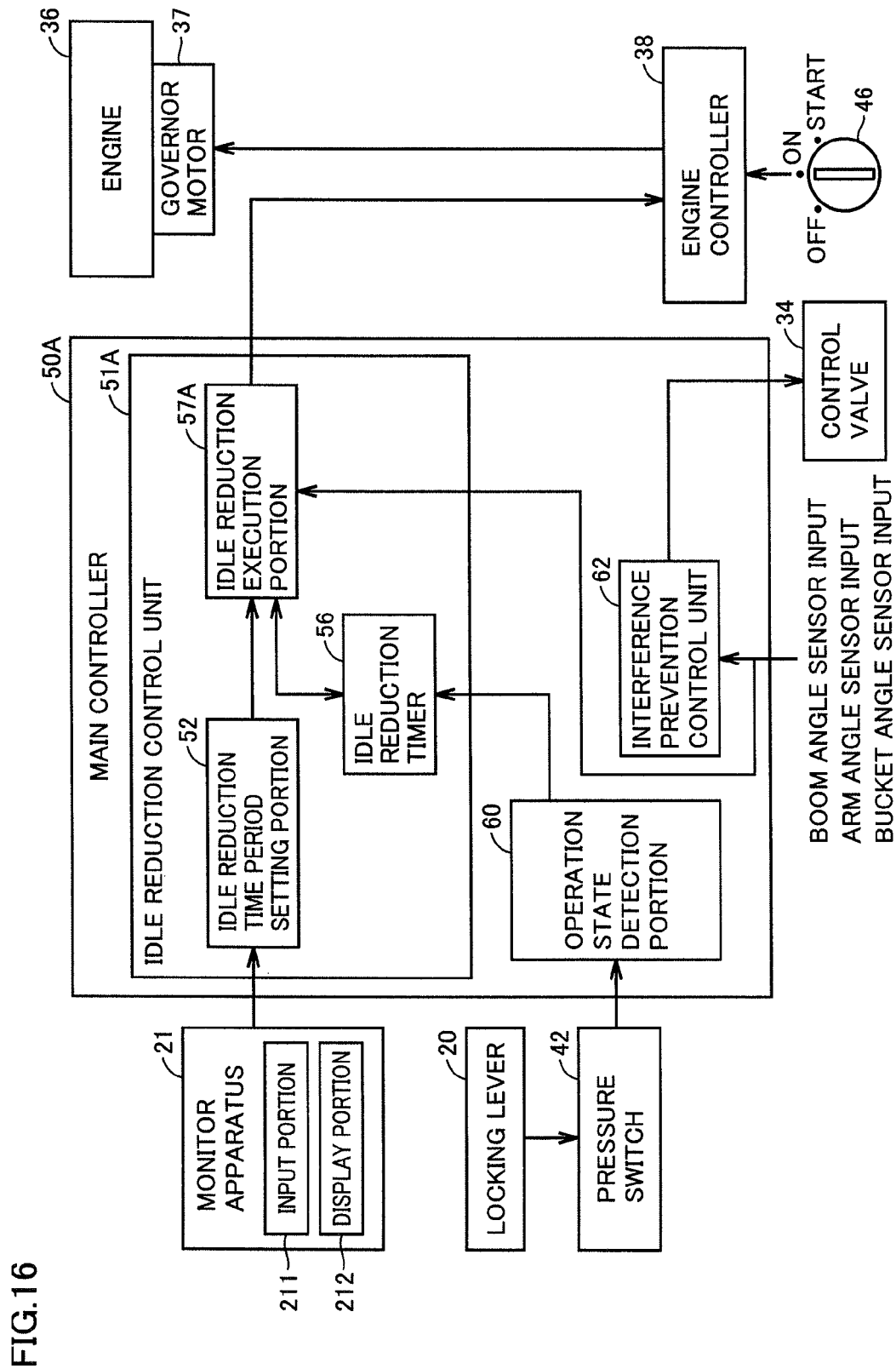
FIG. 16 is a functional block diagram illustrating an idling function of a main controller 50A in the control system of work vehicle 101 based on the second embodiment.

FIG. 16 is a functional block diagram illustrating an idling function of main controller 50A in the control system of work vehicle 101 based on the second embodiment.

As shown in FIG. 16, main controller 50A is different from main controller 50 described in the first embodiment above in that idle reduction control unit 51 is replaced with an idle reduction control unit 51A and an interference prevention control unit 62 is further added. A case that control valve 34 is provided as a peripheral device is shown.

Idle reduction control unit 51A is different from idle reduction control unit 51 in that position determination portion 54 is eliminated and idle reduction execution portion 57 is replaced with an idle reduction execution portion 57A Since other features are basically the same as those in idle reduction control unit 51 described in the first embodiment, detailed description thereof will not be repeated.

Interference prevention control unit 62 obtains information on angles of boom 5, arm 6, and bucket 7 input from angle sensor 39 and calculates a position of bucket 7. Then, interference prevention control unit 62 determines whether or not bucket 7 is located within the interference prevention region, and when it determines that bucket 7 is located within the interference prevention region, it restricts an operation state of work implement 4. Specifically, control valve 34 is instructed to adjust input of a pilot pressure in accordance with an operation direction and/or an amount of operation of work implement levers 18 and 19 or prohibit input of a pilot pressure.

Idle reduction execution portion 57A performs the idle reduction operation based on whether or not tip end portion 7B of bucket 7 is located within interference prevention region 80 of the interference prevention function. In the present example, when tip end portion 7B of bucket 7 is located within interference prevention region 80 of the interference prevention function, idle reduction execution portion 57A does not perform the idle reduction operation, and when tip end portion 7B is not located within interference prevention region 80, it performs the idle reduction operation.

<Interference Prevention Control>

Figure 17:
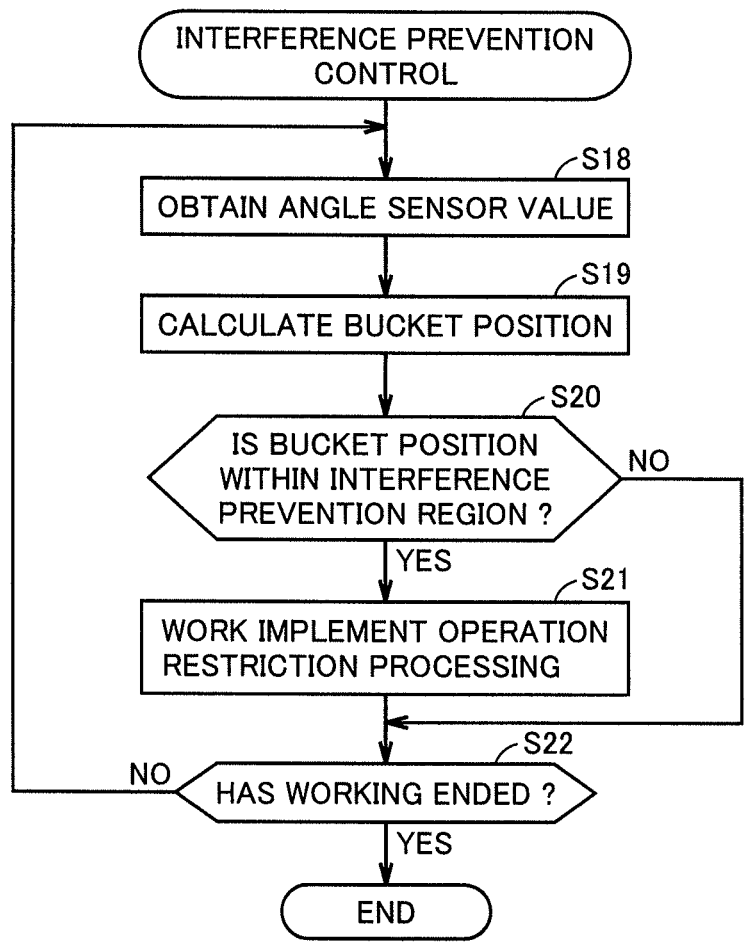
FIG. 17 is a flowchart illustrating interference prevention control processing by an interference prevention control unit 62 based on the second embodiment.

FIG. 17 is a flowchart illustrating interference prevention control processing by interference prevention control unit 62 based on the second embodiment.

As shown in FIG. 17, interference prevention control unit 62 obtains information on an angle input from angle sensor 39 (step S18). Specifically, interference prevention control unit 62 obtains information on angles of boom 5, arm 6, and bucket 7 input from angle sensor 39.

Then, interference prevention control unit 62 calculates a position of bucket 7 (step S19). Specifically, interference prevention control unit 62 calculates a position of bucket 7 through prescribed operational processing based on obtained angle values of boom 5, arm 6, and bucket 7 input from angle sensor 39. For example, an operational expression calculating a position of bucket 7 defined in the two-dimensional coordinate of the X axis and the Y axis described with reference to FIG. 14 is provided in advance and angle values of boom 5, arm 6, and bucket 7 are input in the operational expression, so that a position of bucket 7 in the two-dimensional coordinate can be calculated.

Then, interference prevention control unit 62 determines whether or not bucket 7 is located within the interference prevention region (step S20). Specifically, interference prevention control unit 62 determines whether or not tip end portion 7B of bucket 7 is located within interference prevention region 80 provided in advance and defined in the two-dimensional coordinate of the X axis and the Y axis shown in FIG. 14, based on a result of calculation.

When interference prevention control unit 62 determines in step S20 that bucket 7, that is, tip end portion 7B of bucket 7, is located within interference prevention region 80 (YES in step S20), it performs processing for restricting an operation state of work implement 4 (operation restriction processing) (step S21).

Specifically, when tip end portion 7B of bucket 7 is located within interference prevention region 80, interference prevention control unit 62 instructs control valve 34 to restrict input of a pilot pressure in accordance with an operation direction and/or an amount of operation of work implement levers 18 and 19 to thereby decrease an amount of input of the pilot pressure. An operation of boom 5, arm 6, and bucket 7 of work implement 4 can thus be restricted and they can be operated in a slowed down state.

In response to an input command to move tip end portion 7B of bucket 7 toward cab 8 beyond interference prevention end line 80b of interference prevention region 80, interference prevention control unit 62 prohibits input of a pilot pressure in accordance with an operation direction and/or an amount of operation of work implement levers 18 and 19. An operation of boom 5, arm 6, and bucket 7 of work implement 4 can thus be restricted and an operation to move tip end portion 7B of bucket 7 toward cab 8 beyond interference prevention end line 80b can be inactivated. The interference prevention function can reliably suppress interference of bucket 7 with the vehicle main body.

Then, interference prevention control unit 62 determines whether or not working has ended (step S22). Specifically, interference prevention control unit 62 determines whether or not engine 36 has stopped.

When interference prevention control unit 62 determines in step S22 that working has ended (YES in step S22), the process ends.

When interference prevention control unit 62 determines in step S22 that working has not ended (NO in step S22), the process returns to step S18 and the processing above is repeated.

When interference prevention control unit 62 determines in step S20 that tip end portion 7B of bucket 7 is not located within interference prevention region 80 (NO in step S20), step S21 is skipped and the process proceeds to step S22.

<Idle Reduction Control Processing>

Figure 18:
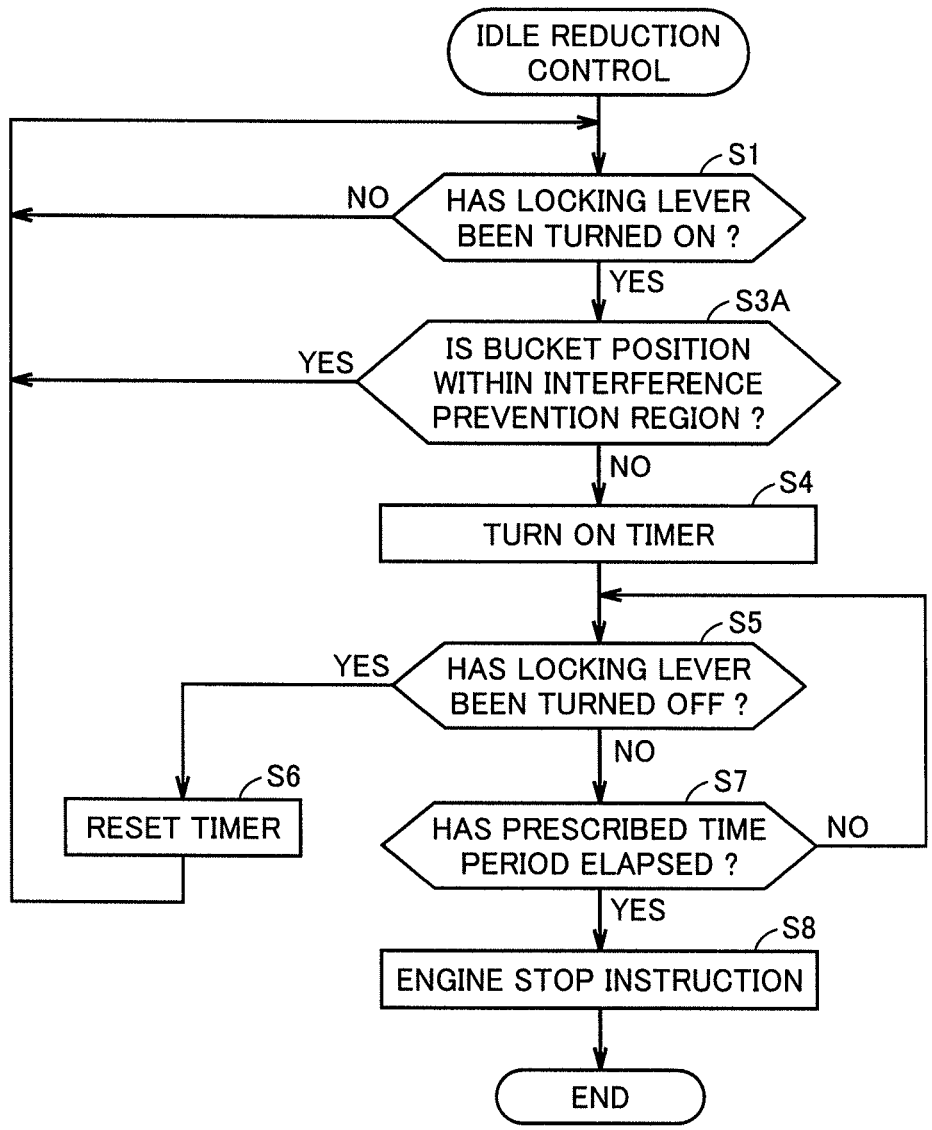
FIG. 18 is a flowchart of an idle reduction control unit 51A based on the second embodiment.

FIG. 18 is a flowchart of idle reduction control unit 51A based on the second embodiment.

As shown in FIG. 18, idle reduction control unit 51A determines whether or not locking lever 20 has been locked (turned on) (step S1). Specifically, operation state detection portion 60 detects locking of locking lever 20 through pressure switch 42 and outputs that fact to idle reduction timer 56. Idle reduction timer 56 determines that locking lever 20 has been locked (turned on), based on a detection signal input from operation state detection portion 60.

Then, when idle reduction control unit 51A determines in step S1 that locking lever 20 has been locked (turned on) (YES in step S1), it determines whether or not bucket 7 is located within the interference prevention region (step S3A). Specifically, as in calculation processing by interference prevention control unit 62, a position of bucket 7 is calculated through prescribed operational processing based on obtained angle values of boom 5, arm 6, and bucket 7 input from angle sensor 39. Then, whether or not tip end portion 7B of bucket 7 is located within interference prevention region 80 provided in advance and defined in the two-dimensional coordinate of the X axis and the Y axis shown in FIG. 14 is determined based on a result of calculation.

Though a case that whether or not tip end portion 7B of bucket 7 is located within interference prevention region 80 is determined based on calculation of a position thereof through prescribed operational processing based on angle values of boom 5, arm 6, and bucket 7 is described in the present example, limitation thereto is not particularly intended, and calculation may be made based on angle values of boom 5 and arm 6. Specifically, whether or not tip end portion 7B of bucket 7 is located within interference prevention region 80 may be determined by assuming an angle value at which bucket 7 is closest to the vehicle main body and calculating (estimating) a position of tip end portion 7B of bucket 7 based on angle values of boom 5 and arm 6. This is also the case with the following variations.

When idle reduction control unit 51A determines in step S3A that bucket 7, that is, tip end portion 7B of bucket 7, is located within interference prevention region 80 (YES in step S3A), the process returns to step S1.

When idle reduction control unit 51A determines in step S3A that bucket 7, that is, tip end portion 7B of bucket 7, is not located within interference prevention region 80 (NO in step S3A), idle reduction timer 56 is started (timer on) (step S4). Specifically, idle reduction execution portion 57A instructs idle reduction timer 56 to count time in accordance with input of a detection signal from operation state detection portion 60. Then, idle reduction timer 56 outputs the counted timer value to idle reduction execution portion 57A. Since the subsequent processing is the same as described with reference to FIG. 8, detailed description thereof will not be repeated. In the processing, that is, when an idling state of work vehicle 101 continues and idle reduction timer 56 starts counting (time count), whether or not tip end portion 7B of bucket 7 is within interference prevention region 80 is determined, and when it is determined that the tip end is within interference prevention region 80, counting by idle reduction timer 56 is not started.

Therefore, when tip end portion 7B of bucket 7 is located within interference prevention region 80, idle reduction control unit 51A does not start counting by idle reduction timer 56. Namely, engine 36 of work vehicle 101 is not stopped by the idle reduction operation. Namely, when tip end portion 7B of bucket 7 is located within interference prevention region 80, control is carried out such that the idle reduction operation is not performed.

Thus, when tip end portion 7B of bucket 7 is located within interference prevention region 80, engine 36 of the work vehicle is prevented from stopping owing to the idle reduction function, and the idle reduction operation can be activated only at a position away from the vehicle main body which is outside the interference prevention region. Namely, interference of tip end portion 7B of bucket 7 with the vehicle main body of the work vehicle when boom 5 moves downward (for example, naturally lowers) due to such an external factor as gravity in the vicinity of the vehicle main body can be suppressed.

(First Variation)

In a first variation, a construction of an offset boom type hydraulic excavator will be described as another example of the work vehicle.

Figure 19:
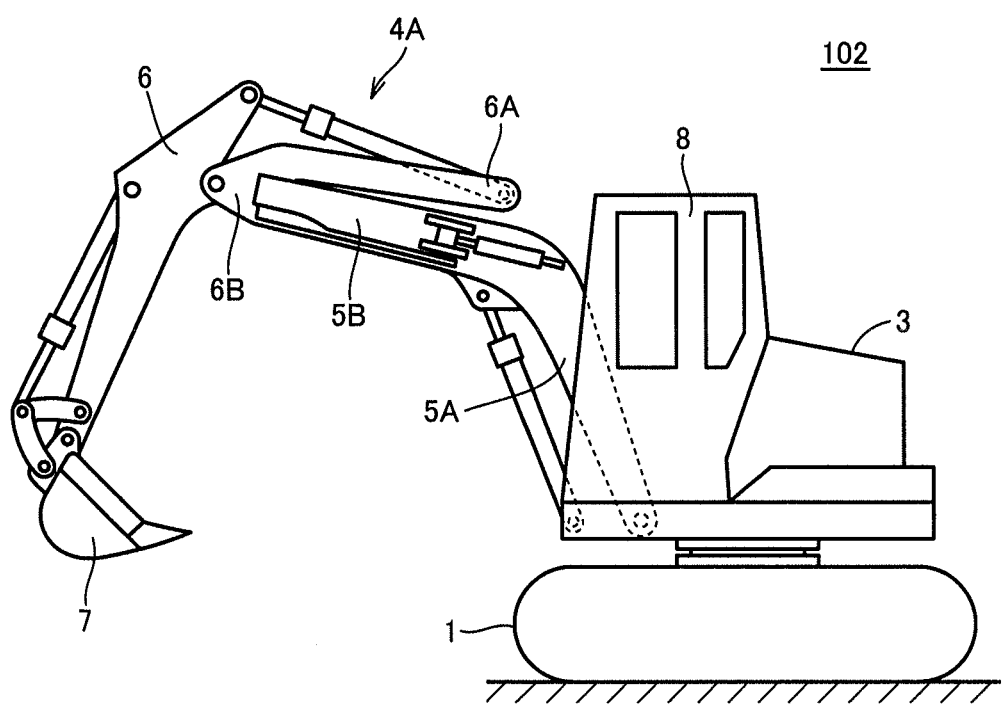
FIG. 19 is a diagram illustrating appearance of a work vehicle 102 based on a first variation of the second embodiment.

FIG. 19 is a diagram illustrating appearance of a work vehicle 102 based on the first variation of the second embodiment.

As shown in FIG. 19, an offset boom type hydraulic excavator is shown by way of example of work vehicle 102. Work vehicle 102 is different from work vehicle 101 mainly in a portion of a work implement 4A, and other portions are basically the same.

Work implement 4A has a first boom 5A, a second boom 5B, a bracket 6B, arm 6, and bucket 7. A root end portion of first boom 5A is supported by upper revolving unit 3 and coupled pivotably around a support axis extending in left and right directions. First boom 5A can thus pivot in the vertical direction with the root end portion serving as the fulcrum. Second boom 5B is coupled to a tip end of first boom 5A as being pivotable in left and right directions. Arm 6 is coupled to a tip end of second boom 5B as being pivotable in front and rear directions with bracket 6B being interposed, and bucket 7 is attached to the tip end of arm 6.

Work vehicle 102 is provided with a plurality of hydraulic cylinders for driving respective portions of work implement 4A. A cylinder for boom for driving first boom 5A, a cylinder for offset for driving second boom 5B, a cylinder for arm for driving arm 6, and a cylinder for bucket for driving bucket 7 are provided. As these hydraulic cylinders are driven, work implement 4A is driven so that such working as excavation and dumping is carried out.

Though not shown, angle sensor 39 is provided in each of the cylinder for boom, the cylinder for offset, the cylinder for arm, and the cylinder for bucket, and obtains information on an angle of each of first boom 5A, second boom 5B, arm 6, and bucket 7.

Figure 20:
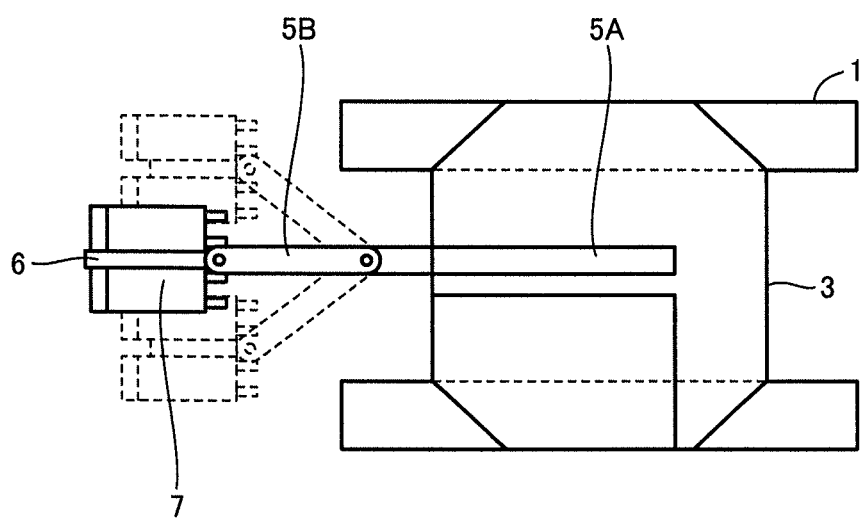
FIG. 20 is a diagram illustrating offset of work vehicle 102 based on the first variation of the second embodiment.

FIG. 20 is a diagram illustrating offset of work vehicle 102 based on the first variation of the second embodiment.

In the present example, a conceptual diagram of work vehicle 102 viewed from above is shown.

As shown in FIGS. 19 and 20, in work implement 4A, when second boom 5B is pivoted to the left and right, bracket 6B pivots by the same angle in a direction reverse to the direction of pivot of second boom 5B, and arm 6 and bucket 7 are offset to the left and right while they always keep relation in parallel to the front and rear directions of upper revolving unit 3. With such a mechanism, excavation working such as excavation against a wall or digging of a gutter can readily be performed.

With an offset function, bucket 7 is provided to be drivable in the left and right direction with first boom 5A being defined as the reference. Therefore, a region where bucket 7 may interfere with the vehicle main body is also different. Namely, the interference prevention region in which the interference prevention function is activated is different in the left and right directions with first boom 5A being defined as the reference.

Figure 21:
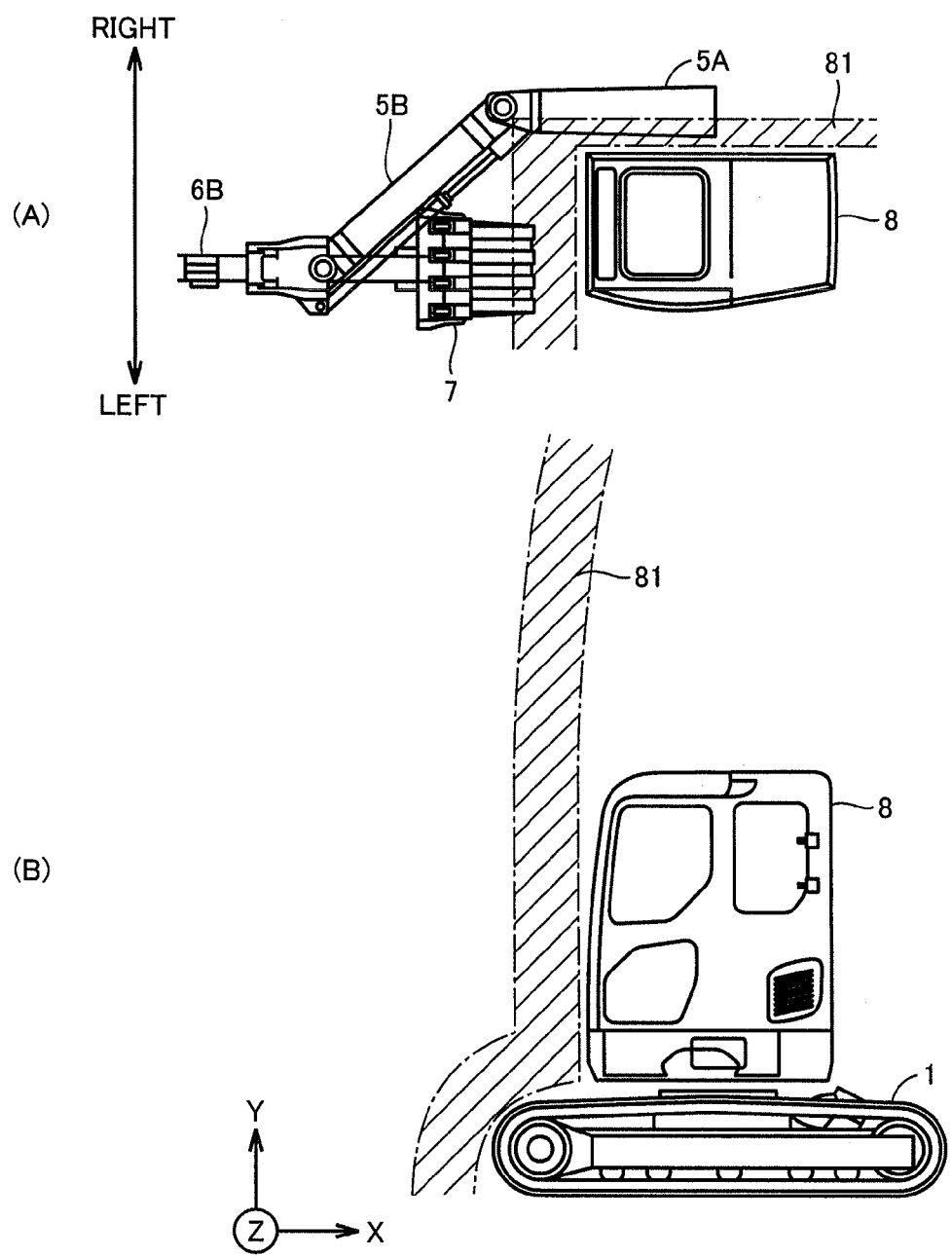
FIG. 21 is a diagram illustrating an interference prevention region based on the first variation of the second embodiment.

FIG. 21 is a diagram illustrating an interference prevention region based on the first variation of the second embodiment.

As shown in FIG. 21, a conceptual view of an interference prevention region in a three-dimensional coordinate defined by the X axis, the Y axis, and the Z axis is shown here. The X axis is the axis in parallel to lower carrier 1 of work vehicle 102 and the Y axis is the axis perpendicular to the X axis. The Z axis is an axis perpendicular to each of the X axis and the Y axis.

Here, a first interference prevention region 81 in a case that bucket 7 is located in the left direction relative to first boom 5A, that is, located on a side of cab 8, is shown.

FIG. 21 (A) shows first interference prevention region 81 when work vehicle 102 is viewed from above. In this regard, a case that the region is provided on an outer peripheral surface of cab 8 is shown.

FIG. 21 (B) shows first interference prevention region 81 when work vehicle 102 is viewed from a side. In this regard, a case that the region is provided on the outer peripheral surface of cab 8 and first interference prevention region 81 is provided also above cab 8 so as to avoid entry of bucket 7 is shown. Thus, not only a case that bucket 7 directly interferes with the work vehicle is suppressed, but also setting is made such that fall of load from bucket 7 due to sudden stop of movement of bucket 7 resulting from stop of the engine while bucket 7 has entered a portion above cab 8 is suppressed.

Figure 22:
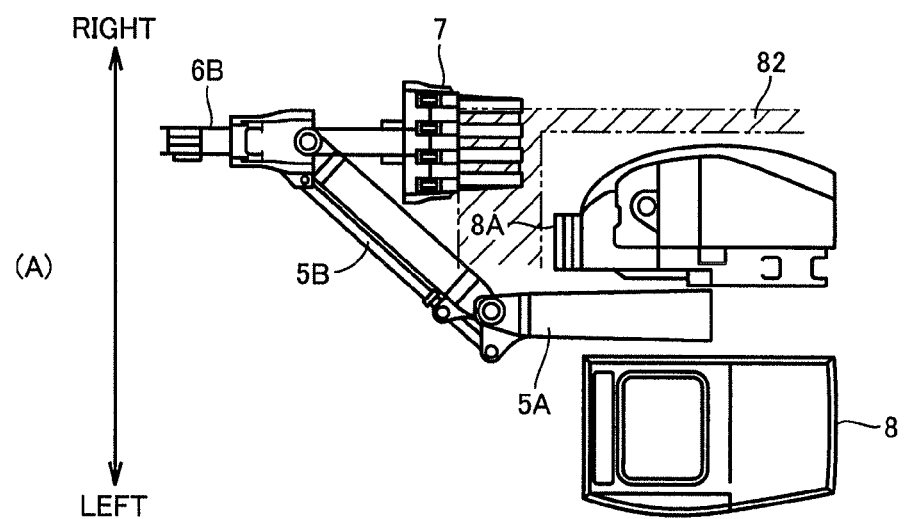
FIG. 22 is a diagram illustrating another interference prevention region based on the first variation of the second embodiment.
Figure 22:
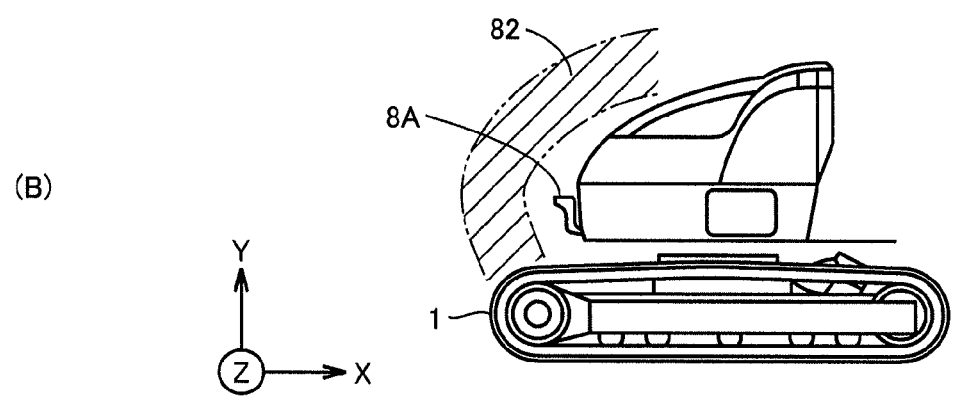

FIG. 22 is a diagram illustrating another interference prevention region based on the first variation of the second embodiment.

As shown in FIG. 22, here, a second interference prevention region 82 in a case that bucket 7 is located in the right direction relative to first boom 5A, that is, located opposite to cab 8, is shown.

FIG. 22 (A) shows second interference prevention region 82 when work vehicle 102 is viewed from above. In this regard, a case that the region is provided on the outer peripheral surface of the vehicle main body is shown.

FIG. 22 (B) shows second interference prevention region 82 when work vehicle 102 is viewed from a side. In this regard, a case that the region is provided on the outer peripheral surface of the vehicle main body is shown. Since no interference prevention region is provided above the vehicle main body unlike the cab 8 side, setting is made such that bucket 7 can move flexibly.

<Interference Prevention Control>

Figure 23:
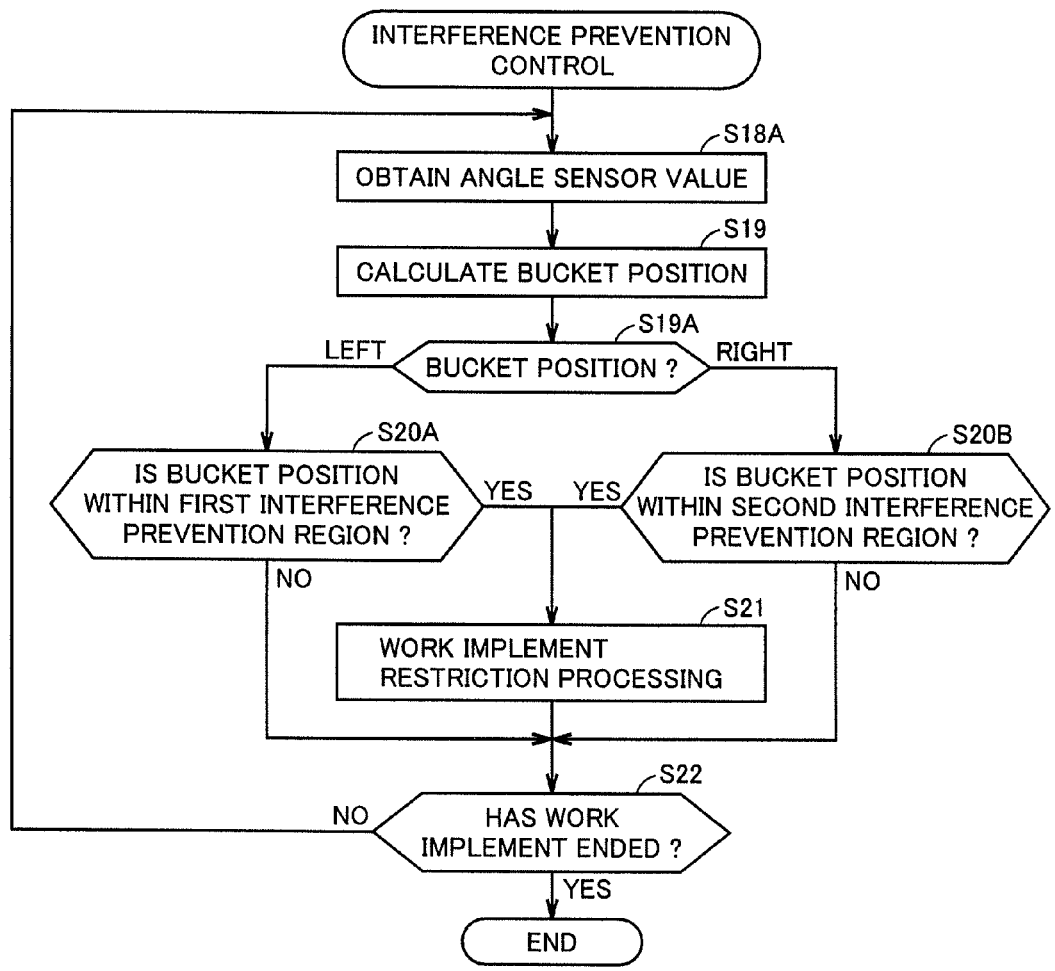
FIG. 23 is a flowchart illustrating interference prevention control processing by interference prevention control unit 62 based on the first variation of the second embodiment.

FIG. 23 is a flowchart illustrating interference prevention control processing by interference prevention control unit 62 based on the first variation of the second embodiment.

As shown in FIG. 23, interference prevention control unit 62 obtains information on an angle input from angle sensor 39 (step S18A). Specifically, information on angles of first boom 5A, second boom 5B, arm 6, and bucket 7 input from angle sensor 39 is obtained.

Then, interference prevention control unit 62 calculates a position of bucket 7 (step S19). Specifically, interference prevention control unit 62 calculates a position of bucket 7 through prescribed operational processing based on obtained angle values of first boom 5A, second boom 5B, arm 6, and bucket 7 input from angle sensor 39. For example, an operational expression for calculating a position of bucket 7 defined in the three-dimensional coordinate of the X axis, the Y axis, and the Z axis described above is provided in advance and angle values of first boom 5A, second boom 5B, arm 6, and bucket 7 are input in the operational expression, so that a position of bucket 7 in the three-dimensional coordinate can be calculated.

Then, interference prevention control unit 62 determines at which position in the left and right directions bucket 7 is located, with first boom 5A being defined as the reference (step S19A). A position in the left and right directions is determined with first boom 5A being defined as the reference, based on a result of calculation of the position of bucket 7.

Then, when interference prevention control unit 62 determines that bucket 7 is located on the left side which is one side in the left and right directions (left in step S19A), it determines whether or not bucket 7 is located within first interference prevention region 81 (step S20A). Specifically, interference prevention control unit 62 determines whether or not tip end portion 7B of bucket 7 is located within first interference prevention region 81 provided in advance and defined in the three-dimensional coordinate of the X axis, the Y axis, and the Z axis shown in FIG. 21, based on the result of calculation. When bucket 7 for which an offset function is not activated is located in the center with first boom 5A being defined as the reference, by way of example, determination that bucket 7 is located on the left side can also be made. Determination to the contrary may also be made.

When interference prevention control unit 62 determines in step S20A that bucket 7, that is, tip end portion 7B of bucket 7, is located within first interference prevention region 81 (YES in step S20A), it performs processing for restricting an operation state of work implement 4A (operation restriction processing) (step S21).

Specifically, when tip end portion 7B of bucket 7 is located within first interference prevention region 81, interference prevention control unit 62 instructs control valve 34 to restrict input of a pilot pressure in accordance with an operation direction and/or an amount of operation of work implement levers 18 and 19 to thereby decrease an amount of input of the pilot pressure. An operation of first boom 5A, second boom 5B, arm 6, and bucket 7 of work implement 4A can thus be restricted and they can be operated in a slowed down state.

In response to an input command to move tip end portion 7B of bucket 7 further toward cab 8 beyond first interference prevention region 81, interference prevention control unit 62 prohibits input of a pilot pressure in accordance with an operation direction and/or an amount of operation of work implement levers 18 and 19. An operation of first boom 5A, second boom 5B, arm 6, and bucket 7 of work implement 4A can thus be restricted and an operation to move tip end portion 7B of bucket 7 toward cab 8 beyond interference prevention end line 80b can be inactivated. With the interference prevention function, interference of bucket 7 with the vehicle main body can reliably be suppressed.

Then, interference prevention control unit 62 determines whether or not working has ended (step S22). Specifically, whether or not engine 36 has stopped is determined.

When interference prevention control unit 62 determines in step S22 that working has ended (YES in step S22), the process ends.

When interference prevention control unit 62 determines in step S22 that working has not ended (NO in step S22), the process returns to step S18A and the processing above is repeated.

When interference prevention control unit 62 determines in step S20A that tip end portion 7B of bucket 7 is not located within first interference prevention region 81 (NO in step S20A), step S21 is skipped and the process proceeds to step S22.

When interference prevention control unit 62 determines that bucket 7 is located on the right side which is the other side in the left and right directions (right in step S19A), it determines whether or not bucket 7 is located within second interference prevention region 82 (step S20B). Specifically, interference prevention control unit 62 determines whether or not tip end portion 7B of bucket 7 is located within second interference prevention region 82 provided in advance and defined in the three-dimensional coordinate of the X axis, the Y axis, and the Z axis shown in FIG. 22, based on the result of calculation.

When interference prevention control unit 62 determines in step S20B that bucket 7, that is, tip end portion 7B of bucket 7, is located within second interference prevention region 82 (YES in step S20B), it performs processing for restricting an operation state of work implement 4A (operation restriction processing) (step S21).

Specifically, when tip end portion 7B of bucket 7 is located within second interference prevention region 82, interference prevention control unit 62 instructs control valve 34 to restrict input of a pilot pressure in accordance with an operation direction and/or an amount of operation of work implement levers 18 and 19 to thereby decrease an amount of input of the pilot pressure. An operation of first boom 5A, second boom 5B, arm 6, and bucket 7 of work implement 4A can thus be restricted and they can be operated in a slowed down state. With the interference prevention function, interference of bucket 7 with the vehicle main body can reliably be suppressed.

Then, interference prevention control unit 62 proceeds to step S22 and the subsequent processing is the same as described above.

When interference prevention control unit 62 determines in step S20B that tip end portion 7B of bucket 7 is not located within interference prevention region 82 (NO in step S20B), step S21 is skipped and the process proceeds to step S22. Idle reduction control processing is the same as described with reference to FIG. 18.

In the processing, that is, when an idling state of work vehicle 102 continues and idle reduction timer 56 starts counting (time count), whether or not tip end portion 7B of bucket 7 is located within first interference prevention region 81 or second interference prevention region 82 of the interference prevention function is determined. When it is determined that it is located within first interference prevention region 81 or second interference prevention region 82, counting by idle reduction timer 56 is not started.

Therefore, when tip end portion 7B of bucket 7 is located within first interference prevention region 81 or second interference prevention region 82, idle reduction control unit 51A does not start counting by idle reduction timer 56. Namely, engine 36 of work vehicle 101 is not stopped by the idle reduction operation. Namely, when tip end portion 7B of bucket 7 is located within first interference prevention region 81 or second interference prevention region 82, control is carried out such that the idle reduction operation is not performed.

Thus, when tip end portion 7B of bucket 7 is located within first interference prevention region 81 or second interference prevention region 82, engine 36 of the work vehicle is prevented from stopping owing to the idle reduction function, and the idle reduction operation can be activated only at a position away from the vehicle main body which is outside the interference prevention region. Namely, when first boom 5A moves downward (for example, naturally lowers) due to such an external factor as gravity in the vicinity of the vehicle main body, interference of tip end portion 7B of bucket 7 with the vehicle main body of the work vehicle can be suppressed.

(Second Variation)

In a second variation, a construction of yet another hydraulic excavator representing a work vehicle will be described.

Figure 24:
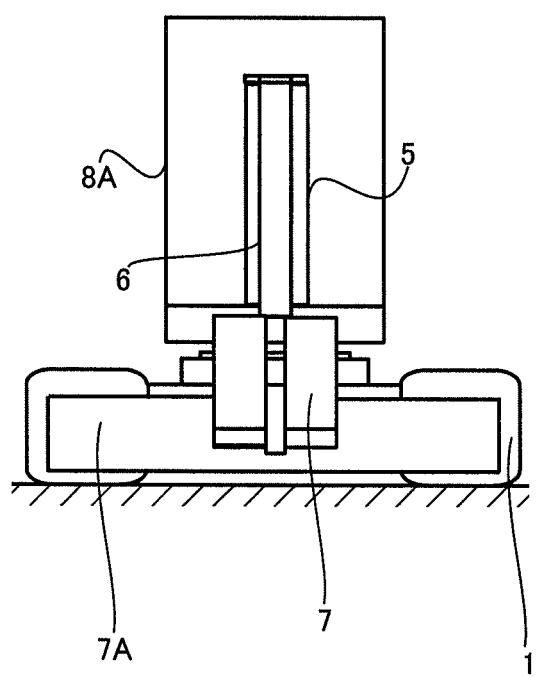
FIG. 24 is a schematic diagram of a work vehicle 103 based on a second variation of the second embodiment when viewed from the front.

FIG. 24 is a schematic diagram of a work vehicle 103 based on the second variation of the second embodiment when viewed from the front.

As shown in FIG. 24, a hydraulic excavator in which a cab 8A is provided in a central portion of a vehicular body is shown by way of example of work vehicle 103. Work vehicle 103 is different from work vehicle 101 in a position of cab 8A and further provision of a blade 7A. Other portions of work implement 4 are basically the same.

Work vehicle 103 is provided with a mechanism with which work implement 4 is swingable to the left and right.

Figure 25:
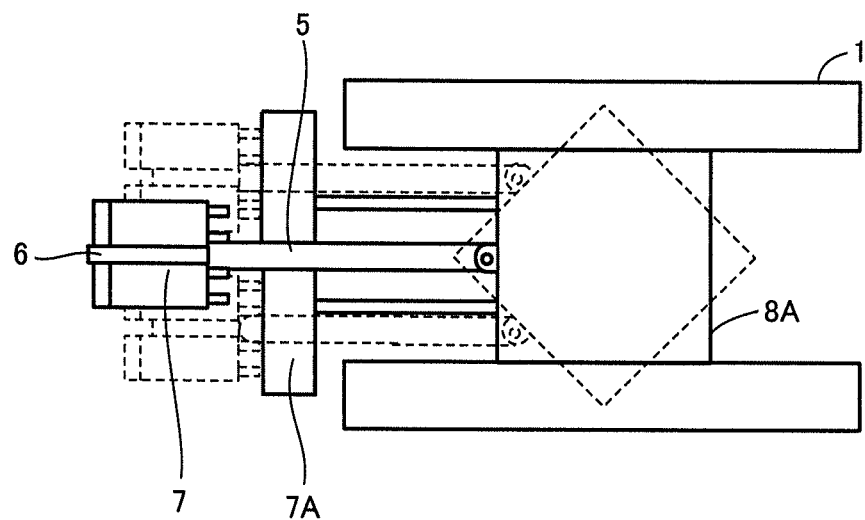
FIG. 25 is a diagram illustrating offset of work vehicle 103 based on the second variation of the second embodiment.

FIG. 25 is a diagram illustrating a state of work implement 4 of work vehicle 103 based on the second variation of the second embodiment.

In the present example, a conceptual diagram of work vehicle 103 viewed from above is shown.

As shown in FIG. 25, cab 8A of work vehicle 103 is pivotably provided with a center of cab 8A being defined as a pivot center. An end portion of cab 8A and an end portion of boom 5 of work implement 4 are coupled to each other and a swing mechanism is provided in the coupling portion. As cab 8A is pivoted to the left and the right, accordingly, boom 5 of work implement 4 also pivots in the same direction. With the swing mechanism, however, boom 5 is pivoted by the same angle in a direction reverse to the direction of pivot of cab 8A. Arm 6 and bucket 7 can thus keep relation in parallel to the front and rear directions of upper revolving unit 3. With such a mechanism, excavation working such as excavation against a wall or digging of a gutter can readily be performed.

In the present example, cab 8A is provided in the central portion of the vehicular body and boom 5 coupled to cab 8A has the same movable region in the left and right directions. Blade 7A is also provided in the center of the vehicular body. Specifically, boom 5 is provided at a position intermediate in lower carrier 1 provided laterally when viewed from above. Then, blade 7A is provided below the same. In the case of work vehicle 103, since cab 8A is located in the rear of boom 5, it does not interfere with bucket 7 but bucket 7 may interfere with blade 7A and lower carrier 1.

Figure 26:
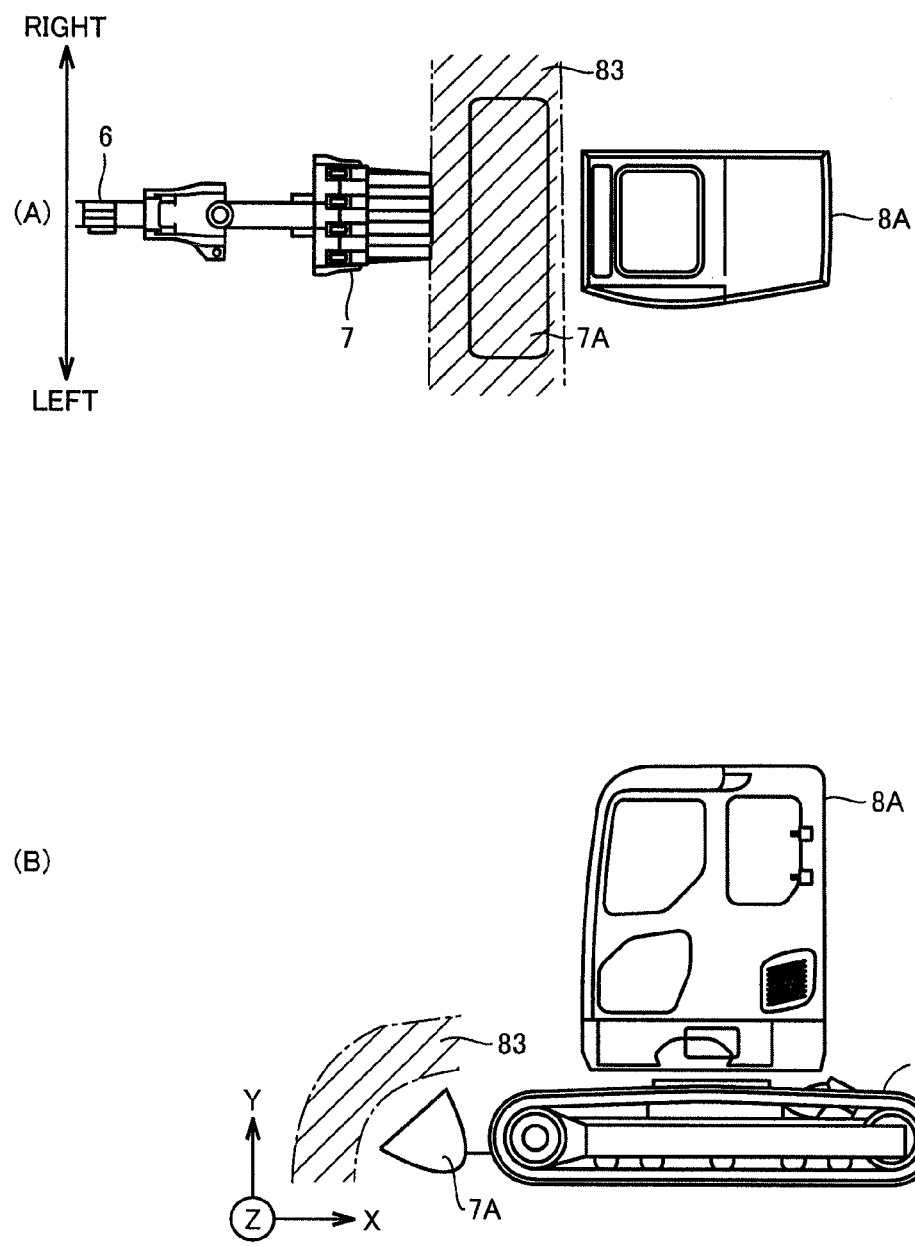
FIG. 26 is a diagram illustrating an interference prevention region based on the second variation of the second embodiment.

FIG. 26 is a diagram illustrating an interference prevention region based on the second variation of the second embodiment.

As shown in FIG. 26, here, a conceptual view of an interference prevention region in the three-dimensional coordinate defined by the X axis, the Y axis, and the Z axis is shown. The X axis is the axis in parallel to lower carrier 1 of work vehicle 103 and the Y axis is the axis perpendicular to the X axis. The Z axis is the axis perpendicular to each of the X axis and the Y axis.

FIG. 26 (A) shows an interference prevention region 83 when work vehicle 103 is viewed from above. As shown in the figure, a region where bucket 7 may interfere with blade 7A representing the vehicle main body is a region the same on the left and on the right. Namely, the interference prevention region where the interference prevention function is activated is the region the same in the left and right directions with boom 5 located at a position intermediate in lower carrier 1 being defined as the reference.

FIG. 26 (B) shows interference prevention region 83 when work vehicle 103 is viewed from a side. In this regard, a case that the region is provided within a prescribed distance from blade 7A and an outer peripheral surface of lower carrier 1 is shown. Thus, setting can be made such that bucket 7 does not directly interfere with the work vehicle.

Since interference prevention control processing of work vehicle 103 based on the second variation of the second embodiment is also the same as described with reference to FIG. 17, detailed description thereof will not be repeated.

The idle reduction control processing is also the same as described with reference to FIG. 18.

Namely, when tip end portion 7B of bucket 7 is located within interference prevention region 83 of the interference prevention function, counting by idle reduction timer 56 is not started. Namely, engine 36 of work vehicle 103 is not stopped by the idle reduction operation. Namely, when tip end portion 7B of bucket 7 is located within interference prevention region 83, control is carried out such that the idle reduction operation is not performed.

Thus, when tip end portion 7B of bucket 7 is located within interference prevention region 83, engine 36 of the work vehicle is prevented from stopping owing to the idle reduction function, and the idle reduction operation can be activated only at a position away from the vehicle main body which is outside the interference prevention region. Namely, when boom 5 moves downward (for example, naturally lowers) due to such an external factor as gravity in the vicinity of the vehicle main body, interference of tip end portion 7B of bucket 7 with the vehicle main body of the work vehicle can be suppressed.

(Third Variation)

In the first variation above, a scheme for performing interference prevention control by changing an interference prevention region based on one and the other of the left and right directions of a position of bucket 7 has been described.

As shown in FIG. 22, regarding second interference prevention region 82 opposite to cab 8, no interference prevention region is provided above the vehicle main body.

Therefore, in a case that bucket 7 is located above the vehicle main body opposite to cab 8, the idle reduction function is activated and hence a case that engine 36 is stopped by the idle reduction operation is possible. When bucket 7 is located above the vehicle main body, a boom moves downward (for example, naturally lowers), for example, due to gravity representing one of external factors depending on a position state of work implement 4A as described with reference to FIG. 7 and bucket 7 may interfere with the vehicle main body.

In the third variation, a scheme for switching determination as to whether or not bucket 7 may interfere with the vehicle main body, in accordance with a position of bucket 7, is described.

Specifically, control is carried out such that, when bucket 7 is located on the cab side provided in one of the left and right directions with first boom 5A being defined as the reference, whether or not tip end portion 7B of bucket 7 is within first interference prevention region 81 is determined, and when it is determined that tip end portion 7B of bucket 7 is located within first interference prevention region 81, the idle reduction operation is not performed.

When bucket 7 is located opposite to the cab provided in one of the left and right directions with first boom 5A being defined as the reference, a position of work implement 4A is determined, and whether or not bucket 7 may interfere with the vehicle main body when first boom 5A moves downward (for example, naturally lowers) due to an external factor is determined.

Specifically, whether or not an angle of arm 6 with respect to second boom 5B (an arm angle) exceeds a prescribed angle is determined. When it is determined that an angle of atm 6 with respect to second boom 5B (an arm angle) exceeds a prescribed angle, it is determined that bucket 7 will not interfere with the vehicle main body due to an external factor from a position state of rest of work implement 4A and determination as position OK is made. When an angle of arm 6 with respect to second boom 5B (an arm angle) is not greater than a prescribed angle, it is determined that bucket 7 may interfere with the vehicle main body due to an external factor from a position state of rest of work implement 4A and determination as position NG is made. Then, when it is determined that bucket 7 may interfere with the vehicle main body due to an external factor from a position state of rest of work implement 4A, control is carried out such that the idle reduction operation is not performed.

<Functional Block Diagram>

Figure 27:
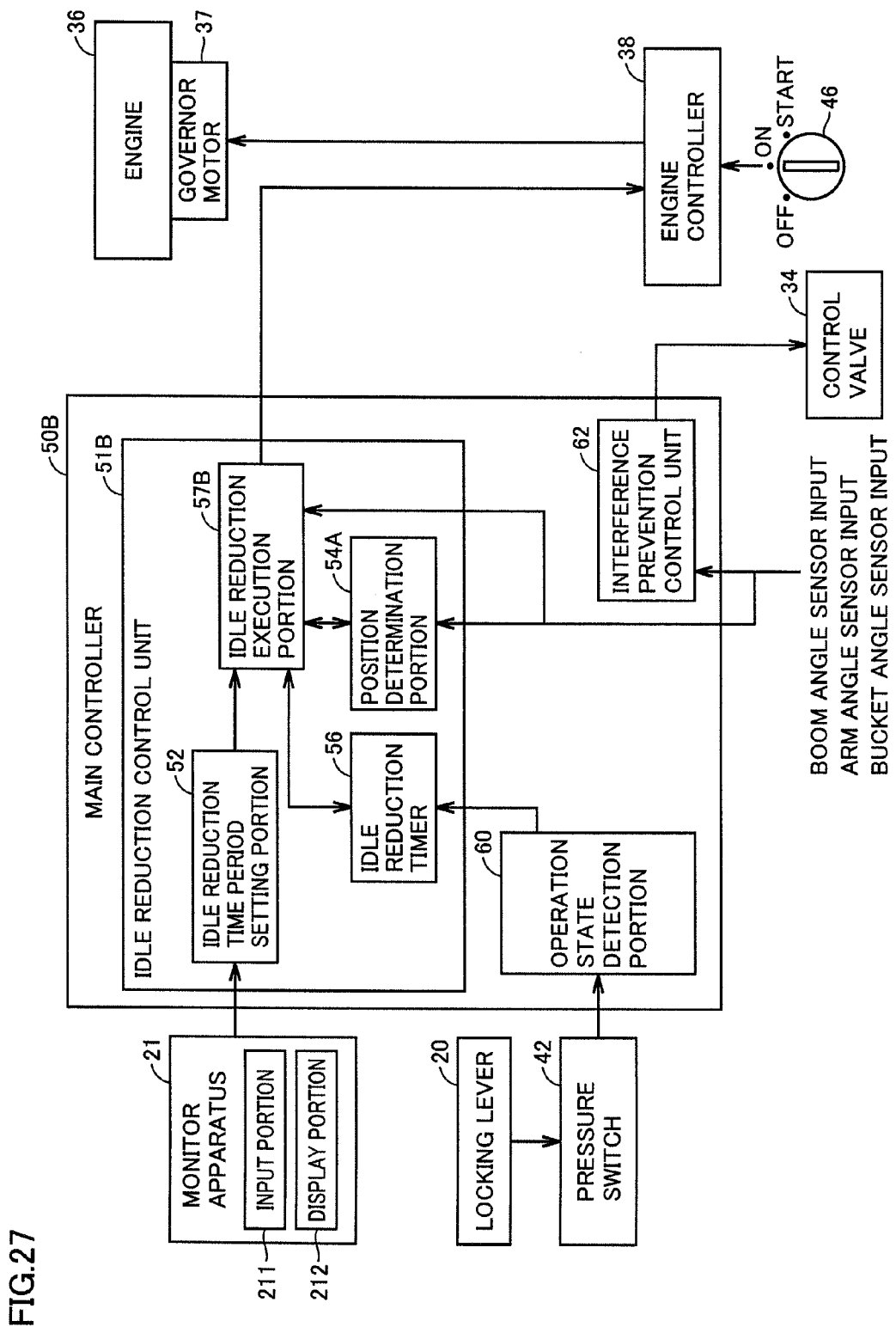
FIG. 27 is a functional block diagram illustrating an idling function of a main controller 50B in the control system of work vehicle 102 based on a third variation of the second embodiment.

FIG. 27 is a functional block diagram illustrating an idling function of a main controller 50B in the control system of work vehicle 102 based on the third variation of the second embodiment.

As shown in FIG. 27, main controller 50B is different from main controller 50A described in the second embodiment above in that idle reduction control unit 51A is replaced with an idle reduction control unit 51B. Idle reduction control unit 51B is different from idle reduction control unit 51A in that idle reduction execution portion 57A is replaced with an idle reduction execution portion 57B and a position determination portion 54A is further added. Since the configuration is otherwise basically the same as that of idle reduction control unit 51A described in the second embodiment, detailed description thereof will not be repeated.

Position determination portion 54A determines whether or not the bucket may interfere with the vehicle main body due to an external factor based on a position state of rest of work implement 4A and outputs a result of determination to idle reduction execution portion 57B.

In the third variation of the second embodiment, when idle reduction execution portion 57B determines that the bucket may interfere with the vehicle main body due to an external factor based on a position state of rest of work implement 4A and based on a result of determination by position determination portion 54A in accordance with a position of bucket 7, it does not perform the idle reduction operation, and when it determines that the bucket will not interfere, it performs the idle reduction operation.

Idle reduction execution portion 57B determines whether or not tip end portion 7B of bucket 7 is within first interference prevention region 81 in accordance with a position of bucket 7, when it determines that the tip end portion is within first interference prevention region 81, it does not perform the idle reduction operation, and when it determines that the tip end portion is not within first interference prevention region 81, it performs the idle reduction operation.

<Idle Reduction Control Processing>

Figure 28:
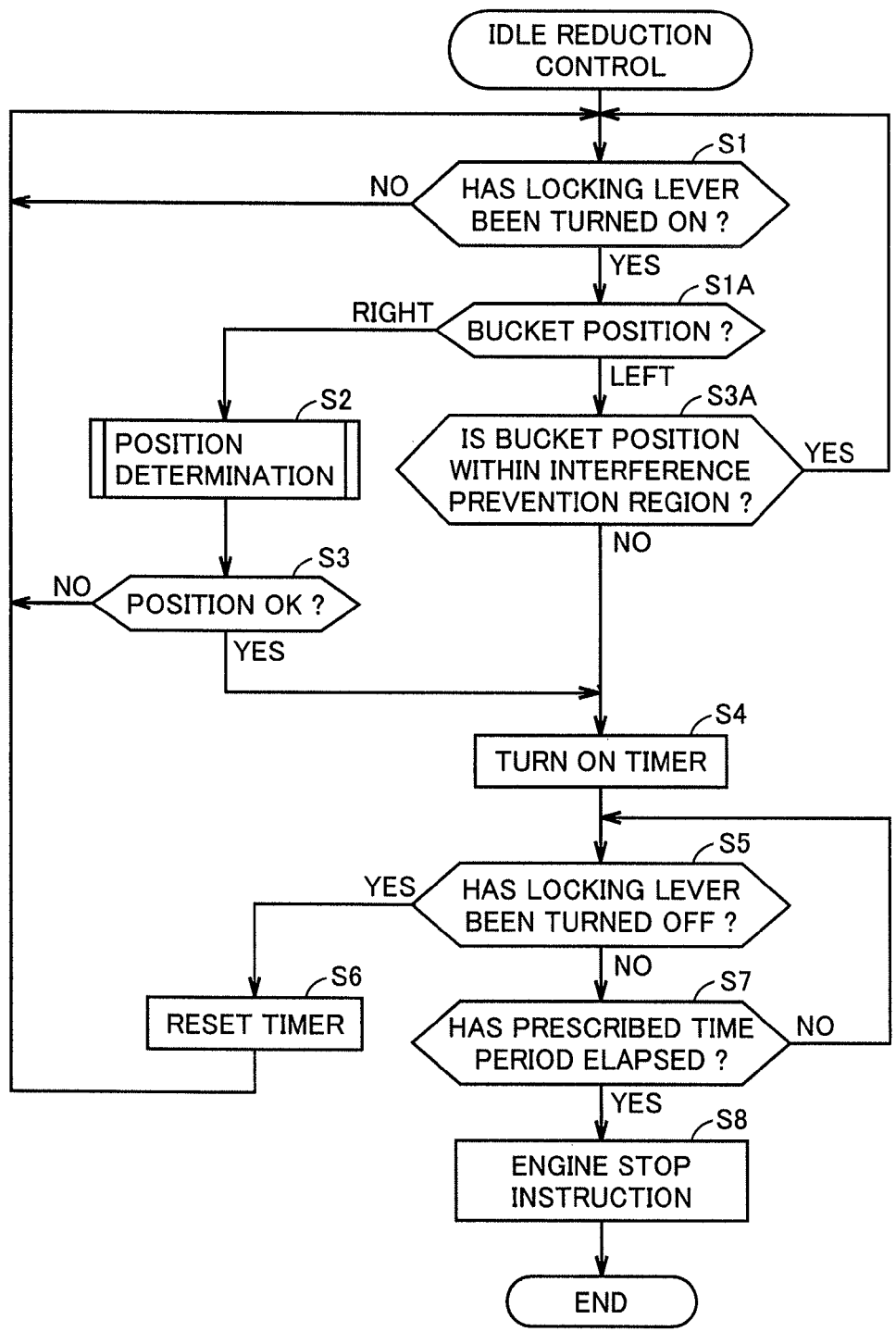
FIG. 28 is a flowchart of an idle reduction control unit 51B based on the third variation of the second embodiment.

FIG. 28 is a flowchart of an idle reduction control unit 51B based on the third variation of the second embodiment.

As shown in FIG. 28, idle reduction control unit 51B determines whether or not locking lever 20 has been locked (turned on) (step S1). Specifically, operation state detection portion 60 detects locking of locking lever 20 through pressure switch 42 and outputs that fact to idle reduction timer 56. Idle reduction timer 56 determines that locking lever 20 has been locked (turned on), based on a detection signal input from operation state detection portion 60.

Then, when idle reduction control unit 51B determines in step S1 that locking lever 20 has been locked (turned on) (YES in step S1), it determines a position of bucket 7 and determines in which of the left and right directions it is located (step S1A). Specifically, idle reduction execution portion 57B obtains information from interference prevention control unit 62 and determines in which of the left and right directions bucket 7 is located relative to first boom 5A.

Then, when idle reduction control unit 51B determines in step S1A that a position of bucket 7 is located on the cab side provided in one of the left and right directions (by way of example, on the left side) (left in step S1A), it determines whether or not bucket 7 is located within the interference prevention region (step S3A). Specifically, as in calculation processing in interference prevention control unit 62, a position of bucket 7 is calculated through prescribed operational processing based on obtained angle values of boom 5, arm 6, and bucket 7 input from angle sensor 39. Then, whether or not tip end portion 7B of bucket 7 is located within first interference prevention region 81 provided in advance and defined in the two-dimensional coordinate of the X axis and the Y axis shown in FIG. 21 is determined based on a result of calculation.

When idle reduction control unit 51B determines in step S3A that bucket 7, that is, tip end portion 7B of bucket 7, is located within first interference prevention region 81 (YES in step S3A), the process returns to step S1.

When idle reduction control unit 51B determines in step S3A that bucket 7, that is, tip end portion 7B of bucket 7, is not located within first interference prevention region 81 (NO in step S3A), it starts idle reduction timer 56 (timer on) (step S4). Specifically, idle reduction execution portion 57B instructs idle reduction timer 56 to count time in accordance with input of a detection signal from operation state detection portion 60. Then, idle reduction timer 56 outputs the counted timer value to idle reduction execution portion 57B. Since the subsequent processing is the same as described with reference to FIG. 8, detailed description thereof will not be repeated.

When idle reduction control unit 51B determines in step S1A that a position of bucket 7 is located opposite to the cab side provided in one of the left and right directions (by way of example, on the right side) (right in step S1A), it performs position determination processing (step S2). Specifically, idle reduction execution portion 57B instructs position determination portion 54A to perform processing for determining a position state of rest of work implement 4A based on an angle sensor value input from angle sensor 39.

In the present example, by way of example, position determination portion 54A performs processing for determining a position state of rest of work implement 4A based on an arm angle from angle sensor 39 provided in the cylinder for arm.

Position determination portion 54A determines whether or not an arm angle exceeds threshold value α based on comparison between an arm angle obtained from angle sensor 39 and threshold value α. Then, when position determination portion 54A determines that an arm angle exceeds threshold value α, determination as position OK is made. Namely, it is determined that bucket 7 will not interfere with the vehicle main body due to an external factor from a position state of rest of work implement 4A.

When position determination portion 54A determines that an arm angle does not exceed threshold value α, that is, it is not greater than threshold value α, determination as position NG is made. Namely, it is determined that bucket 7 may interfere with the vehicle main body due to an external factor from a position state of rest of work implement 4A.

Then, idle reduction control unit 51B determines whether or not position OK determination has been made based on a result of determination by position determination portion 54A (step S3). Specifically, idle reduction execution portion 57B determines whether or not a signal indicating that position OK determination has been made is received from position determination portion 54A.

When idle reduction control unit 51B makes determination as position NG in step S3 based on a result of determination by position determination portion 54A (NO in step S3), the process returns to step S1.

When idle reduction control unit 51B determines in step S3 that determination as position OK has been made based on a result of determination by position determination portion 54A (YES in step S3), it starts idle reduction timer 56 (timer on) (step S4). Specifically, idle reduction execution portion 57B instructs idle reduction timer 56 to count time based on input of a detection signal from operation state detection portion 60. Then, idle reduction timer 56 outputs a counted timer value to idle reduction execution portion 57B. Since the subsequent processing is the same as described with reference to FIG. 8, detailed description thereof will not be repeated.

In the processing, that is, when the idling state of work vehicle 102 continues and idle reduction timer 56 starts counting (time count), a scheme for determining whether or not interference with the vehicle main body is likely is switched based on a position of bucket 7.

Specifically, when bucket 7 is located on the left relative to first boom 5A, whether or not tip end portion 7B of bucket 7 is within first interference prevention region 81 is determined, and when it is determined that the tip end portion is within first interference prevention region 81, counting by idle reduction timer 56 is not started.

Therefore, when tip end portion 7B of bucket 7 is located within first interference prevention region 81, idle reduction control unit 51B does not start counting by idle reduction timer 56. Namely, engine 36 of work vehicle 102 is not stopped by the idle reduction operation. Namely, when tip end portion 7B of bucket 7 is located within first interference prevention region 81, control is carried out such that an idle reduction operation is not performed.

Thus, when tip end portion 7B of bucket 7 is located within first interference prevention region 81, engine 36 of work vehicle 102 is prevented from stopping owing to the idle reduction function, and the idle reduction operation can be activated only at a position away from the vehicle main body which is outside the interference prevention region. Namely, when boom 5 moves downward (for example, naturally lowers) due to such an external factor as gravity in the vicinity of the vehicle main body, interference of tip end portion 7B of bucket 7 with the vehicle main body of the work vehicle can be suppressed.

When bucket 7 is located on the right relative to first boom 5A and when it is determined in the position determination processing that bucket 7 may interfere with the vehicle main body due to an external factor from a position state of rest of work implement 4A, counting by idle reduction timer 56 is not started.

Therefore, idle reduction timer 56 does not start counting until it is determined in the position determination processing by position determination portion 54A that bucket 7 will not interfere with the vehicle main body due to an external factor from a position state of rest of work implement 4A. Namely, engine 36 of work implement 102 is not stopped by the idle reduction operation. Namely, when it is determined that bucket 7 may interfere with the vehicle main body due to an external factor from a position state of rest of work implement 4A, control is carried out such that the idle reduction operation is not performed.

Thus, interference of bucket 7 with the vehicle main body when an operation of the work vehicle is stopped owing to the idle reduction function can be suppressed.

By switching a scheme for determining whether or not bucket 7 may interfere with the vehicle main body in accordance with a position of bucket 7 with the scheme above, interference of tip end portion 7B of bucket 7 with the vehicle main body of the work vehicle when an operation of the work vehicle is stopped owing to the idle reduction function and when boom 5 moves downward (for example, naturally lowers) due to such an external factor as gravity can more reliably be suppressed.

Though a scheme that the idle reduction control unit determines whether or not tip end portion 7B of bucket 7 is located within the interference prevention region and when it determines that the tip end portion is located within the interference prevention region, the idle reduction operation is not performed has been described in the present example, whether or not to perform the idle reduction operation may be determined by making use of the function of interference prevention control unit 62 and based on whether or not the interference prevention function of interference prevention control unit 62 restricts an operation of the work implement. Alternatively, the idle reduction control unit may make use of a result of calculation as to whether or not tip end portion 7B of bucket 7 is located within the interference prevention region as processing by interference prevention control unit 62 so as to determine whether or not to perform the idle reduction operation.

Though a hydraulic excavator has been described by way of example of a work vehicle in the present example, application also to such a work vehicle as a bulldozer or a wheel loader is possible, and application to any work machine provided with engine 36 is possible.

Though the embodiments of the present invention have been described above, it should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST 1 lower carrier; 3 upper revolving unit; 4, 4A work implement; 5 boom; 5A first boom; 5B second boom; 5P, 6P pivot center; 6 arm; 6B bracket; 7 bucket; 7B tip end portion; 8 cab; 9 operator's seat; 10 travel operation portion; 11, 12 travel lever; 13, 14 travel pedal; 15 pedal for attachment; 16 side window; 17 dashboard; 18, 19 work implement lever; 20 locking lever; 21 monitor apparatus; 22 front window; 23 vertical frame; 31A first hydraulic pump; 31B second hydraulic pump; 32 swash plate drive apparatus; 33 pump controller; 34 control valve; 35 hydraulic actuator; 36 engine; 37 governor motor; 38 engine controller; 39 angle sensor; 41 work implement lever apparatus; 42 pressure switch; 43 valve; 46 starter switch; 47 pressure sensor; 50, 50A, 50B main controller; 51, 51A, 51B idle reduction control unit; 52 idle reduction time period setting portion; 54, 54A position determination portion; 56 idle reduction timer; 57, 57A, 57B idle reduction execution portion; 60 operation state detection portion; 62 interference prevention control unit; 70, 72 ground; 71, 73 gravity center position; 80 interference prevention region; 80a interference prevention start line; 80b interference prevention end line; 81 first interference prevention region; 82 second interference prevention region; 101, 102 work vehicle; 111 deceleration switch; 112 operation mode selection switch; 113 travel speed gear selection switch; 114 buzzer cancellation switch; 115 wiper switch; 116 washer switch; 117 air-conditioner switch; 211 input portion; 212 display portion; and 213 display control unit.

The invention claimed is:

1. A work vehicle, comprising:
a vehicle main body;
a work implement provided in said vehicle main body and including a boom provided to be drivable in a vertical direction, an arm provided to be drivable with respect to said boom, and a bucket attached to a tip end of said arm;
an engine;
an idle reduction execution portion which can stop said engine in an idling state; and
a position determination portion determining whether said bucket may interfere with said vehicle main body based on a position state of rest of said work implement,
the position determination portion determining whether said bucket may interfere with said vehicle main body based on whether at least any one of a first angle of the arm with respect to said boom and an angle formed between said boom and said vehicle main body satisfies a first prescribed condition and determining whether said bucket may interfere with said vehicle main body based on whether at least any one of a second angle of the arm with respect to said boom and the angle formed between said boom and said vehicle main body satisfies a second prescribed condition, and
said idle reduction execution portion not stopping said engine when said position determination portion determines that said bucket may interfere with said vehicle main body and stopping said engine when said position determination portion determines that said bucket will not interfere.

2. A work vehicle, comprising:
a vehicle main body;
a work implement provided in said vehicle main body and including a boom provided to be drivable in a vertical direction, an arm provided to be drivable with respect to said boom, and a bucket attached to a tip end of said arm;
an engine;
an idle reduction execution portion which can stop said engine in an idling state;
an interference prevention control unit which can restrict an operation state of said work implement such that said bucket does not interfere with said vehicle main body, based on whether a position of said bucket is within an interference prevention region provided within a prescribed distance from an outer peripheral surface of said vehicle main body,
a position determination portion which determines whether said bucket may interfere with said vehicle main body based on a position state of rest of said work implement; and
a cab provided in said vehicle main body,
said arm being provided to be drivable in left and right directions with said boom being defined as the reference,
in a case that a position of said bucket is located on a side of the cab provided in one of the left and right directions with said boom being defined as the reference, said idle reduction execution portion not stopping said engine when said bucket is within said interference prevention region and stopping said engine when said bucket is not within said interference prevention region, and
in a case that the position of said bucket is located in the other of said left and right directions, said idle reduction execution portion not stopping said engine when said position determination portion determines that said bucket may interfere with said vehicle main body and stopping said engine when said position determination portion determines that said bucket will not interfere.

3. The work vehicle according to claim 2, wherein
said boom has a first boom provided to be drivable in the vertical direction and a second boom provided to be drivable in left and right directions with said first boom being defined as a reference, and
said interference prevention region includes first and second interference prevention regions brought in correspondence with said left and right directions, with said first boom being defined as the reference.

4. The work vehicle according to claim 3, wherein
ranges of said first and second interference prevention regions in accordance with the outer peripheral surface of said vehicle main body are identical.

* * * * *